(12) United States Patent
Ishigami et al.

(10) Patent No.: US 7,797,103 B2
(45) Date of Patent: Sep. 14, 2010

(54) NAVIGATION APPARATUS

(75) Inventors: Tadatomi Ishigami, Tokyo (JP); Norihiro Nishiuma, Tokyo (JP); Yoshitsugu Sawa, Tokyo (JP); Yukio Goto, Tokyo (JP); Hiroyuki Kumazawa, Tokyo (JP); Masaharu Umezu, Tokyo (JP); Tomoya Ikeuchi, Tokyo (JP); Atsushi Kohno, Tokyo (JP); Masayuki Ishida, Tokyo (JP); Mitsuo Shimotani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 618 days.

(21) Appl. No.: 11/680,971

(22) Filed: Mar. 1, 2007

(65) Prior Publication Data

US 2007/0213927 A1  Sep. 13, 2007

(30) Foreign Application Priority Data

Mar. 10, 2006 (JP) ............................. 2006-066349
Nov. 17, 2006 (JP) ............................. 2006-311883

(51) Int. Cl.
*G01C 21/00* (2006.01)

(52) U.S. Cl. ............... 701/207; 340/995.1; 340/995.22; 706/48

(58) Field of Classification Search ............... 701/207, 701/208; 340/995.1, 995.22; 706/48; 348/211.3
See application file for complete search history.

(56) References Cited

U.S. PATENT DOCUMENTS

| | | | |
|---|---|---|---|
| 4,982,332 A * | 1/1991 | Saito et al. .................. | 701/208 |
| 5,821,880 A * | 10/1998 | Morimoto et al. ...... | 340/995.21 |
| 6,356,837 B1 * | 3/2002 | Yokota et al. ............... | 701/208 |
| 6,694,255 B1 * | 2/2004 | Kainuma et al. ............ | 701/209 |
| 6,856,895 B2 * | 2/2005 | Hashida ...................... | 701/207 |
| 7,342,516 B2 * | 3/2008 | Kato et al. ............. | 340/995.19 |
| 7,480,565 B2 * | 1/2009 | Ikeuchi et al. ............... | 701/208 |
| 7,634,452 B2 * | 12/2009 | Adachi et al. .................. | 706/46 |
| 2002/0128772 A1 * | 9/2002 | Polidi et al. .................. | 701/208 |
| 2003/0020602 A1 * | 1/2003 | Hata et al. ............... | 340/425.5 |
| 2004/0102899 A1 * | 5/2004 | Kaji et al. .................... | 701/210 |
| 2006/0080034 A1 * | 4/2006 | Hayashi ...................... | 701/211 |
| 2006/0293843 A1 * | 12/2006 | Morita et al. ............... | 701/207 |
| 2007/0058625 A1 * | 3/2007 | Fushiki et al. .............. | 370/389 |
| 2009/0018759 A1 * | 1/2009 | Endo et al. .................. | 701/117 |

FOREIGN PATENT DOCUMENTS

| | | | |
|---|---|---|---|
| JP | 021266219 | | 10/1990 |
| JP | 2001194163 A | * | 7/2001 |
| JP | 2001-264092 | | 9/2001 |

* cited by examiner

*Primary Examiner*—Tuan C To
(74) *Attorney, Agent, or Firm*—Oblon, Spivak, McClelland, Maier & Neustadt, L.L.P.

(57) ABSTRACT

A navigation apparatus includes an unregistered road detecting means for setting up a detection start point and a detection end point for an unregistered road on registered roads which are respectively located before and behind sections in which matching result data indicates a free state, respectively, the matching result data indicating a matching state when the vehicle is traveling each of the registered roads, for performing a coordinate transformation on a traveling path which is created from positioning data and which is extending between the two points so that the traveling path has coordinates which match with the coordinates of a registered road between them, and for detecting the coordinates of the unregistered road from a portion of the coordinate-transformed traveling path which does not overlap any registered road, and a road data generating means for creating road data about the unregistered road from the coordinates of the unregistered road.

17 Claims, 15 Drawing Sheets

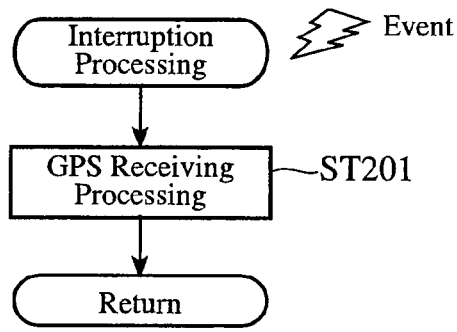
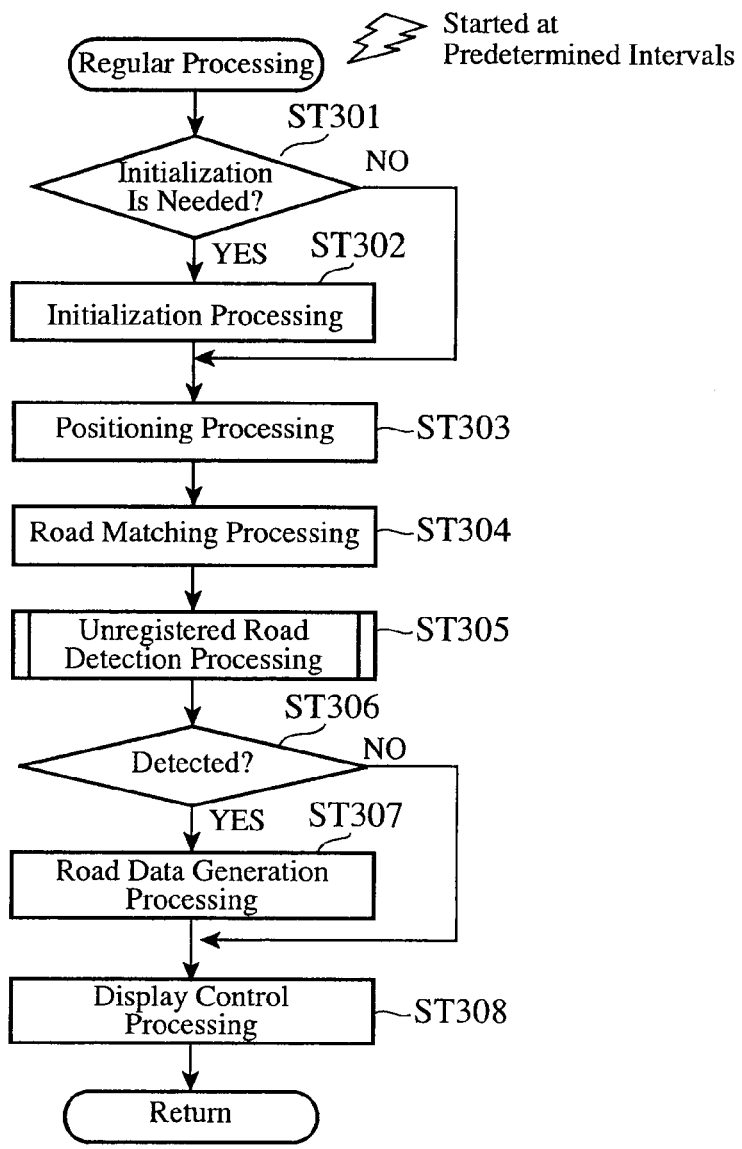

FIG.5
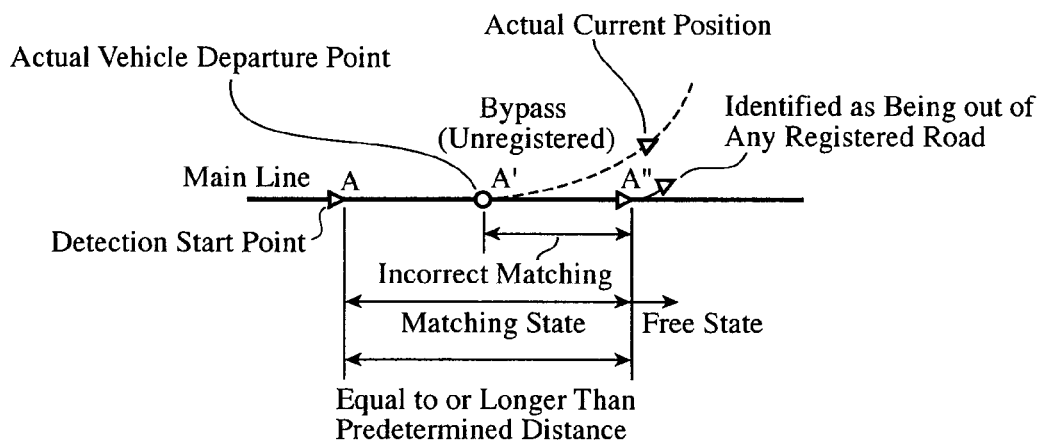
FIG.6A
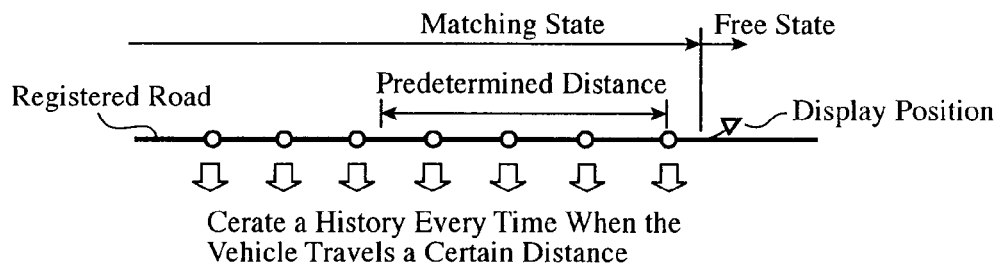
FIG.6B
(Historical Data)
| Start Point History ID | Time | Positioning Results: Position, Direction, Velocity, Traveled Distance, Angle of Turning, GPS Electric Wave Reception State, Etc. | Road Matching Results: Position, Direction, Matching State, Road Data, Etc. |
|---|---|---|---|

Polygonal-Line Approximation $N_i$ : Start Point or Interpolation Point

FIG.9A

Before Affine Transformation

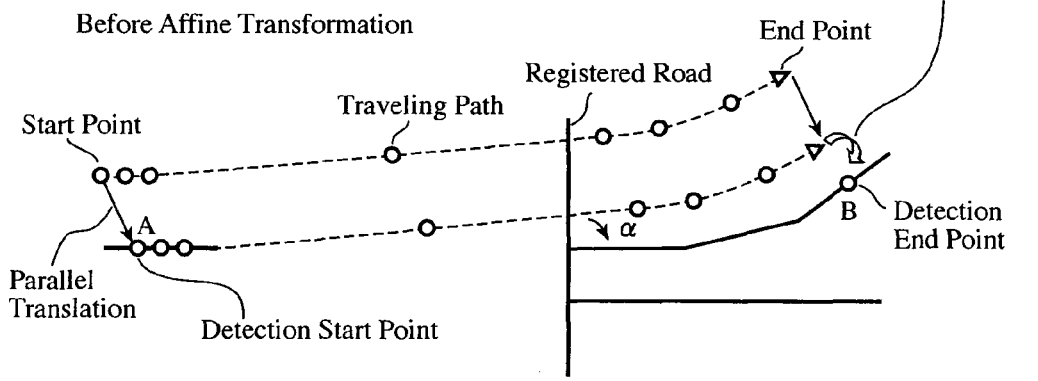

FIG.9B

After Affine Transformation

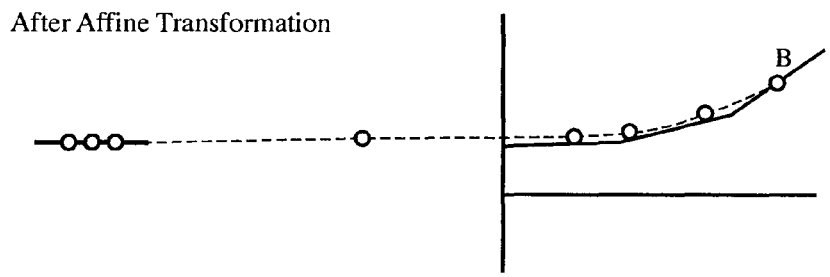

FIG.9C

Deletion of Section in Which Unregistered Road Overlaps Registered Road

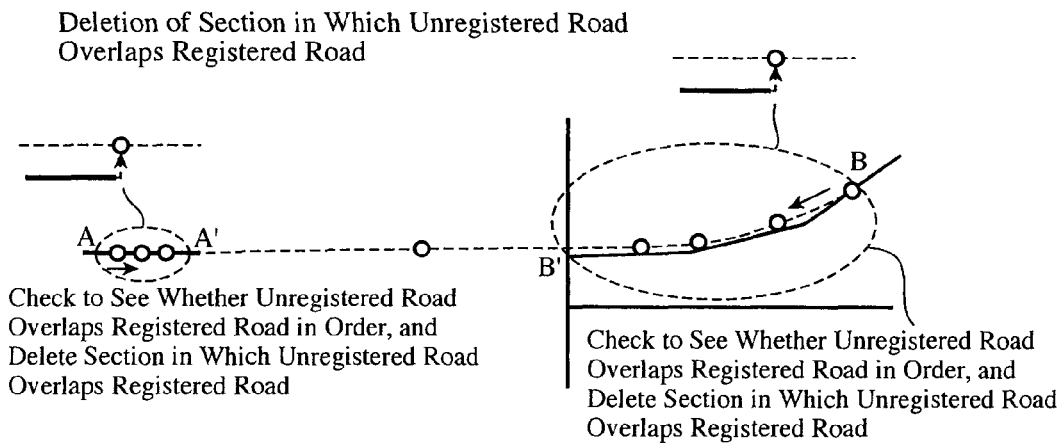

Check to See Whether Unregistered Road Overlaps Registered Road in Order, and Delete Section in Which Unregistered Road Overlaps Registered Road Check to See Whether Unregistered Road Overlaps Registered Road in Order, and Delete Section in Which Unregistered Road Overlaps Registered Road

FIG.9D

Coordinates at Which Unregistered Road Is Connected to Registered Road

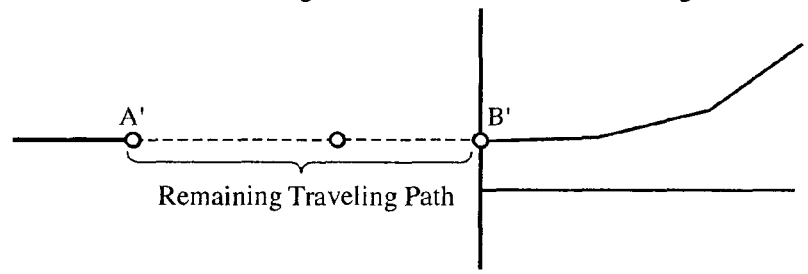

State in Which Traveling Path Is Separated Into Parts Immediately After Vehicle Has Passed Through Tunnel State in Which Affine Transformation Is Partially Performed on Separated Sections of Traveling Path So That Single Connected Traveling Path Is Created State in Which Affine Transformation Is Performed on Whole Connected Traveling Path Incorrect Matching to Registered Road Running in Parallel with Unregistered Road When Vehicle Passes through Unregistered Road Validation of Registered Road Running in Parallel with Unregistered Road When Vehicle Passes through Unregistered Road Validation of Expansion-And-Contraction Coefficient of Traveling Path, and Judgment of Whether Vehicle Has Traveled along Registered Road or Unregistered Road After Making Left Turn

NAVIGATION APPARATUS

BACKGROUND OF THE INVENTION

1. Field of the Invention

The present invention relates to a navigation apparatus. More particularly, it relates to a technology for, when a vehicle equipped with the navigation apparatus has traveled an unregistered road about which road data is not registered in the navigation apparatus, creating road data about the unregistered road from the traveling path of the vehicle.

2. Description of Related Art

Conventionally, a navigation apparatus which creates road data about an unregistered road and registers the road data in road map data when a vehicle equipped with the navigation apparatus has traveled the unregistered road about which road data is not registered in the road map data is known. For example, patent reference 1 discloses a navigation apparatus which stores the traveling path of a vehicle when the vehicle has traveled an off-road, and, after that, reads the traveling path so as to display it, and a navigation method at a time when the vehicle is traveling an off-road. This navigation apparatus disclosed by patent reference 1 creates road data automatically on the basis of the traveling path of the vehicle in a section in which the current position of the vehicle cannot be map-matched onto any road indicated by road data. If the navigation apparatus can determine that the current position of the vehicle is out of any road indicated by road data when the vehicle has traveled from a registered road indicated by road data created automatically to an unregistered road about which road data is not registered, the navigation apparatus defines, as a branch point of the registered road, the current position of the vehicle, and creates road data automatically on the basis of the traveling path of the vehicle after the branch point.

Patent reference 2 discloses a method of creating road map data which is applied in order to create road map data for use in a navigation system or the like. In accordance with this road-map-data creation method, the traveling path M of a vehicle which has traveled an unknown route extending from a first point A (i.e., a vehicle departure point) whose position on the road map data is known to a second point B (i.e., a vehicle return point) whose position on the road map data is known, the first and second points being set up manually by the user, is obtained, a rotation operation around the first point A and a scaling operation are performed on the traveling path M of the vehicle in order to make the end point of the traveling path M agree with the second point B so that the traveling path M of the vehicle is corrected for, and road map data is created on the basis of the corrected traveling path. According to this creation method of creating road map data, only one drive of the vehicle along a route about which road map data should be created makes it possible to easily create correct road map data about a road, such as a road newly constructed, without having to wait for supply of road map data obtained by taking an aerial photograph or the like of the road.

[Patent reference 1] JP-A 2002-357431

[Patent reference 2] JP-A 06-201392

However, the prior art navigation apparatus disclosed by patent reference 1 has the following problems. That is, because the prior art navigation apparatus is so designed as to carry out a map matching process of comparing road data with the current position of the vehicle on the assumption that the vehicle travels a road, it is difficult for the prior art navigation apparatus to determine that the current position of the vehicle is out of any registered road indicated by the road data when it is placed in a matching state in which the current position of the vehicle is map-matched onto a registered road, and, when the vehicle travels an unregistered road while the prior art navigation apparatus is placed in a free state (i.e., a state which is not the matching state), the prior art navigation apparatus may determine that the current position of the vehicle is on a registered road incorrectly if the registered road runs in parallel with and in the vicinity of the traveling path of the vehicle. On the other hand, when there are two or more roads near the current position of the vehicle, the prior art navigation apparatus does not determine that the current position of the vehicle is on a registered road until it will have continued to recognize a similarity in the shape of the traveling path of the vehicle and consistency of the current position of the vehicle with the registered road while the vehicle has been traveling a predetermined distance or longer. A problem with the prior art navigation apparatus is therefore that when it detects the coordinates of an unregistered road and registered roads to which the unregistered road is connected from the traveling path of the vehicle in a section where the prior art navigation apparatus is placed in the free state in which the current position of the vehicle is out of any registered road, large errors occurs in the detection results.

A problem with the prior art creation method of creating road map data disclosed by patent reference 2 is that a navigation system using the creation method cannot detect any unregistered road when the user cannot operate the navigation system even if the user wants to operate it (e.g., when the user is driving a well-trafficked road) or when the user has forgotten to operate the navigation system, the navigation system cannot detect any unregistered road, and, when the user has failed to operate it (when the user is driving an unfamiliar area, the user may not perform operations correctly to set up the first and second points), the navigation system specifies roads connected to an unregistered road incorrectly.

SUMMARY OF THE INVENTION

The present invention is made in order to solve the above-mentioned problems, and it is therefore an object of the present invention to provide a navigation apparatus which, when a vehicle equipped with the navigation apparatus travels a road including an unregistered road which is not registered in road map data, can detect the coordinates of the unregistered road from the traveling path of the vehicle automatically and correctly so as to create road data about the unregistered road.

In accordance with the present invention, there is provided a navigation apparatus including: a sensor for detecting a behavior of a vehicle; a positioning means for estimating the behavior of the vehicle on a basis of a signal from the sensor; a road-map-data storage means for storing road data; a road matching means for comparing positioning data sent thereto, as an estimation result, from the positioning means with the road data read from the road-map-data storage means so as to identify a current position of the vehicle, and for judging whether the identification is placed in a matching state in which the current position is finally identified as being on a registered road defined by the road data, in a pending state in which whether or not the current position is on a registered road is being judged, or in a free state in which the current position is finally identified as being out of any registered road, and then outputting matching result data indicating the state of the identification; an unregistered road detecting means for setting up a detection start point and a detection end point for an unregistered road on registered roads which are respectively located before and behind sections in which the matching result data from the road matching means indicates that the state of the identification is the free state, respectively, the matching result data indicating that the state of the identification is the matching state when the vehicle travels along each of the registered roads, for performing a coordinate transformation on a traveling path which is created on a basis of the positioning data from the positioning means and which is assumed to extend from the detection start point to the detection end point in a coordinate system so that a start point of the traveling path has coordinates which match with coordinates of the detection start point and an end point of the traveling path has coordinates which match with coordinates of the detection end point, and for detecting coordinates of the unregistered road from a portion of the coordinate-transformed traveling path which does not overlap any registered road if each of an amount of movement in a coordinate system, an expansion and contraction coefficient, and a rotation angle of the traveling path, which are caused by the coordinate transformation, falls within a predetermined range which is estimated from the accuracy of the current position of the vehicle and the accuracy of correction of the sensor; and a road data generating means for creating road data about the unregistered road on a basis of the coordinates of the unregistered road detected by the unregistered road detecting means, and for storing them in the road-map-data storage means.

The navigation apparatus according to the present invention defines, as a detection section for an unregistered road, a section between two points respectively on registered roads in which the state of the identification of the current position of the vehicle is the matching state, the two points being respectively located before and behind sections in which the state of the identification is the free state, performs a coordinate transformation on a traveling path between the two points which is estimated regardless of processing carried out by the road matching means so that the start point and end point of the traveling path have coordinates which match with the coordinates of the two points, respectively, determines that sections of the traveling path which are similar to parts of the registered roads, respectively, and which are running in parallel with the parts of the registered roads overlap the registered roads, respectively, if each of the amount of movement in the coordinate system, expansion and contraction coefficient, and rotation angle of the traveling path, which are caused by the coordinate transformation, falls within a predetermined range which is estimated from the accuracy of the current position of the vehicle and the accuracy of correction of the sensor, and removes the sections of the traveling path from the traveling path, and then detects the coordinates of the unregistered road from the remaining traveling path. Therefore, the navigation apparatus in accordance with the present invention can prevent detection of an unregistered road with a low degree of reliability, and can detect the coordinates of an unregistered road with a higher degree of accuracy. As a result, the navigation apparatus in accordance with the present invention can carry out route searching and route guidance on the basis of the road data including data about unregistered roads.

Further objects and advantages of the present invention will be apparent from the following description of the preferred embodiments of the invention as illustrated in the accompanying drawings.

BRIEF DESCRIPTION OF THE DRAWINGS

FIG. 2 is a flow chart showing interruption processing carried out by the navigation apparatus according to embodiment 1 of the present invention;

FIG. 3 is a flow chart showing regular processing carried out by the navigation apparatus in accordance with embodiment 1 of the present invention;

FIG. 5 is a diagram showing a positional relationship between a detection start point and a vehicle departure point for an unregistered road in the navigation apparatus in accordance with embodiment 1 of the present invention;

FIG. 6 is a diagram for explaining historical data created in order to set up the detection start point for the unregistered road in the navigation apparatus in accordance with embodiment 1 of the present invention;

FIG. 9 is a diagram showing a procedure for detecting the coordinates of the unregistered road from the traveling path including the unregistered road in the navigation apparatus in accordance with embodiment 1 of the present invention;

DETAILED DESCRIPTION OF THE PREFERRED EMBODIMENTS

Hereafter, the preferred embodiments of the invention will now be described with reference to the accompanying drawings.

Embodiment 1

Figure 1:
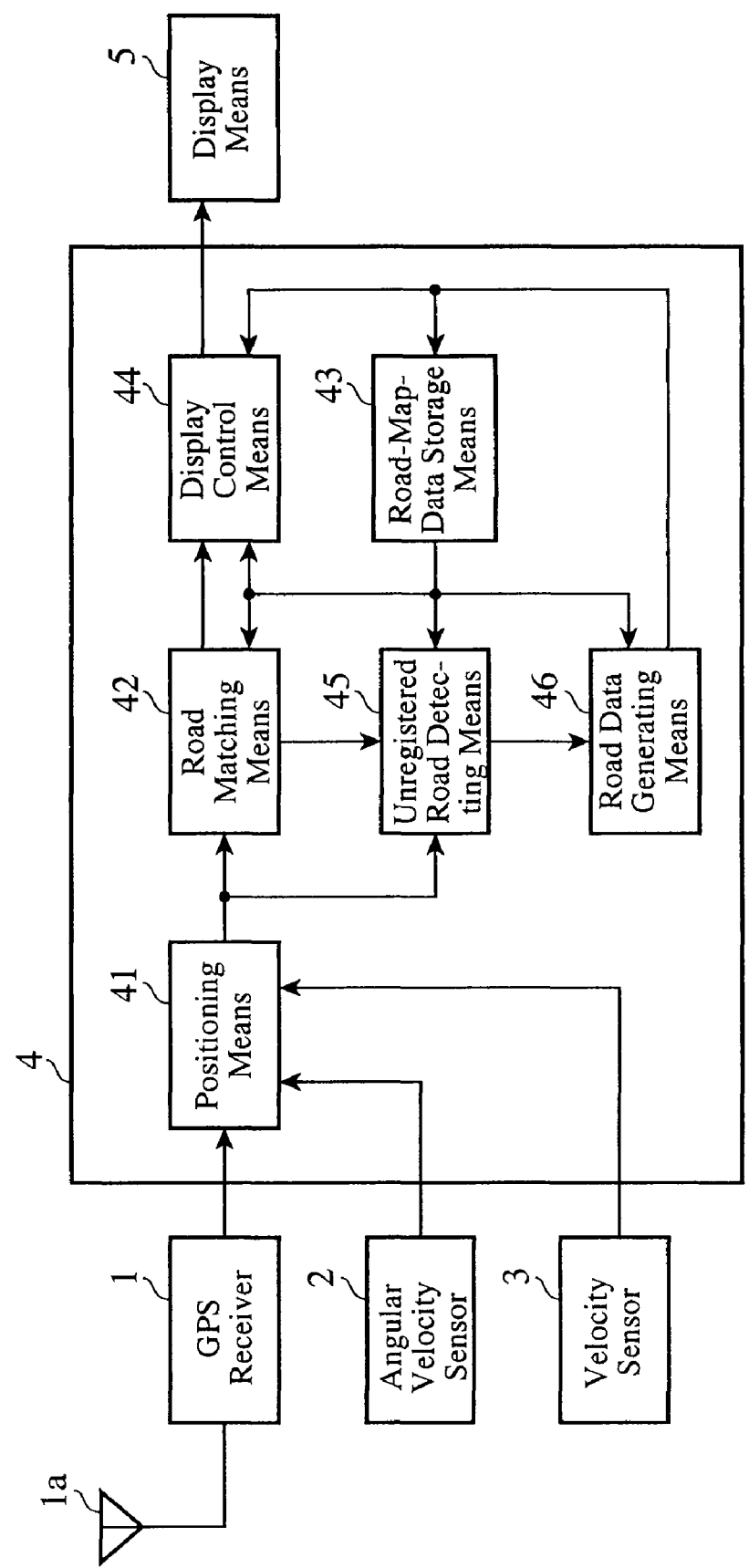
FIG. 1 is a block diagram showing the structure of a navigation apparatus according to embodiment 1 of the present invention.

FIG. 1 is a block diagram showing the structure of a navigation apparatus according to embodiment 1 of the present invention. This navigation apparatus is provided with a GPS (Global Positioning System) receiver 1, an angular velocity sensor 2, a velocity sensor 3, a signal processing unit 4, and a display unit 5. The sensors of this navigation apparatus according to the present invention thus include the GPS receiver 1, angular velocity sensor 2, and velocity sensor 3.

The GPS receiver 1 receives GPS electric waves transmitted thereto from GPS satellites by way of a GPS antenna 1a, and generates a GPS signal. The angular velocity sensor 2 detects the angle of turning of a vehicle equipped with the navigation apparatus, and generates an angular velocity signal. The velocity sensor 3 detects the velocity of the vehicle and generates a velocity signal. The GPS signal generated by the GPS receiver 1, the angular velocity signal generated by the angular velocity sensor 2, and the velocity signal generated by the velocity sensor 3 are sent to the signal processing unit 4 as signals indicating the behavior of the vehicle.

The signal processing unit 4 consists of, for example, a computer, and runs according to a control program which is stored in a memory (not shown) in advance so as to carry out a process of implementing functions needed for navigation, for example, position detection, route searching, route guidance, etc. The details of this signal processing unit 4 will be explained below.

The display unit 5 consists of, for example, a liquid crystal display, and displays various pieces of information on the screen thereof according to display data sent thereto from the signal processing unit 4. For example, the display unit 5 superimposes and displays the current position of the vehicle, a route, etc. on an on-screen map.

The above-mentioned signal processing unit 4 is provided with a positioning means 41, a road matching means 42, a road-map-data storage means 43, a display control means 44, an unregistered road detecting means 45, and a road data generating means 46.

The positioning means 41 estimates the behavior of the vehicle, and more specifically, estimates the current position, traveling direction, velocity, and so on of the vehicle on the basis of the velocity signal sent from the velocity sensor 3, the GPS signal sent from the GPS receiver 1, and the angular velocity signal sent from the angular velocity sensor 2. The results estimated by this positioning means 41 are then sent, as positioning data, to the road matching means 42 and unregistered road detecting means 45.

The road matching means 42 compares the positioning data sent from the positioning means 41 with road data read from the road-map-data storage means 43 so as to identify the current position of the vehicle, and further judges whether the state of the identification of the current position of the vehicle is a matching state in which the current position of the vehicle is finally determined to be on a road defined by the road data (referred to as a "registered road" from here on), a pending state in which whether or not the current position of the vehicle is on a registered road is being determined, or a free state in which the current position of the vehicle is finally determined to be out of any registered road. The judgment result obtained by this road matching means 42 is sent, as matching result data, to the display control means 44 and unregistered road detecting means 45.

The road-map-data storage means 43 stores the road data. The road data stored in this road-map-data storage means 43 can be read by the road matching means 42, display control means 44, unregistered road detecting means 45, and road data generating means 46. Furthermore, road data generated by the road data generating means 46 can be stored in this road-map-data storage means 43.

The display control means 44 generates display data for superimposing and displaying the current position of the vehicle, the route, etc. on an on-screen map on the basis of the matching result data sent from the road matching means 42, the road map data read from the road-map-data storage means 43, and the road data sent from the road data generating means 46. The display data generated by this display control means 44 are sent to the display unit 5.

The unregistered road detecting means 45 automatically detects the coordinates of an unregistered road and the coordinates of each registered road to which this unregistered road is connected (simply referred to as "the coordinates of an unregistered road" in the specification and claims of the present invention) from the traveling path of the vehicle at a time when the vehicle has traveled along the unregistered road about which road data has not been registered in the road-map-data storage means 43 on the basis of the positioning data sent from the positioning means 41, the matching result data sent from the road matching means 42, and the road data read from the road-map-data storage means 43. The coordinates of the unregistered road thus detected by the unregistered road detecting means 45 are sent to the road data generating means 46.

On the basis of the coordinates of the unregistered road sent from the unregistered road detecting means 45, and the road data read from the road-map-data storage means 43, the road data generating means 46 generates road data about the unregistered road. The road data generated by the road data generating means 46 are sent to the road-map-data storage means 43 and stored in this road-map-data storage means 43 while they are also sent to the display control means 44.

Next, the operation of the navigation apparatus according to embodiment 1 of the present invention which is constructed as mentioned above will be explained schematically. FIG. 2 is a flow chart showing an interruption process carried out by the positioning means 41 of the navigation apparatus according to embodiment 1 of the present invention.

The interruption process is started in response to an event. To be more specific, when the GPS signal has been sent thereto from the GPS receiver 1, the positioning means starts the interruption process. In this interruption process, the positioning means 41 carries out a GPS receiving process (in step ST201). That is, the positioning means 41 receives the GPS signal sent from the GPS receiver 1 and stores it, as GPS data, in a memory (not shown). After that, the positioning means 41 returns the sequence to the interrupted step and then ends the interruption process.

FIG. 3 is a flow chart showing an outline of a regular process which is started at predetermined intervals. In this regular process, the navigation apparatus determines whether the program incorporated into the signal processing unit 4 needs to be initialized first (in step ST301). The navigation apparatus determines that the program needs to be initialized when the engine of the vehicle is started and supply of power to the navigation apparatus is then started. When, in this step ST301, determining that the initialization of the program is needed, the navigation apparatus then carries out the process of initializing the program (in step ST302). That is, the program incorporated into the signal processing unit 4 is initialized. In contrast, when, in step ST301, determining that the initialization of the program is not needed, the navigation apparatus skips the initialization process of step ST302.

The navigation apparatus then carries out a positioning process (in step ST303). Concretely, the positioning means 41 calculates the velocity of the vehicle and the distance which the vehicle has traveled during each predetermined time interval on the basis of the velocity signal sent from the velocity sensor 3. The positioning means 41 also calculates the angle of turning which the vehicle has made during each predetermined time interval on the basis of the angular velocity signal sent from the angular velocity sensor 2. After that, the positioning means 41 determines the behavior of the vehicle, and, more specifically, calculates the current position, traveling direction, velocity, etc. of the vehicle (which are called the DR position, the DR direction, etc.), and sends them, as well as the GPS data which are received from the GPS receiver 1 and stored in the memory (i.e., a current position, a traveling direction, a velocity, a GPS electric wave reception state, etc.), to the road matching means 42 and unregistered road detecting means 45 as the positioning data. The positioning means 41 also makes a sensor correction to the velocity signal sent from the velocity sensor 3 and the angular velocity signal sent from the angular velocity sensor 2. Concrete descriptions of the determination of the behavior of the vehicle and sensor correction are disclosed in, for example, Japanese Patent No. 3321096. So, please refer to it if needed.

The navigation apparatus then carries out a road matching process (in step ST304). That is, the road matching means 42 identifies the current position (referred to as the "M position") of the vehicle on the basis of road data about a certain region which is read from the road-map-data storage means 43, and the positioning data indicating the behavior of the vehicle determined by the positioning means 41. The road matching means 42 then determines that the state of the identification of the current position of the vehicle is the matching state when the road matching means has identified only one current position of the vehicle on a registered road, determines that the state of the identification is the pending state when the road matching means has selected one candidate from two or more candidates for the current position of the vehicle each of which is defined as coordinates on a registered road and is judging the selected candidate, or determines that the state of the identification is the free state when the road matching means identifies the current position of the vehicle as being out of any registered road, and sends matching result data indicating the determined state of the identification to the display control means 44 and unregistered road detecting means 45. A concrete description of the process of identifying the current position of the vehicle is disclosed in, for example, JP,2000-346663,A. So, please refer to it if needed.

The navigation apparatus then carries out an unregistered road detection process (in step ST305). In this unregistered road detection process, the navigation apparatus carries out a process of detecting an unregistered road using the unregistered road detecting means 45. The details of this unregistered road detection process will be explained below. The navigation apparatus then checks to see whether an unregistered road has been detected (in step ST306). When, in this step ST306, determining that the unregistered road detecting means has detected an unregistered road, the navigation apparatus carries out a road data generation process (in step ST307). That is, the road data generating means 46 generates road data about an unregistered road from the coordinates of the unregistered road detected by the unregistered road detecting means 45, and adds the generated road data to the road map data stored in the road-map-data storage means 43. After that, the navigation apparatus changes a flag indicating whether an unregistered road has been detected to "no detection." When, in above-mentioned step ST306, determining that the unregistered road detecting means has detected no unregistered road, the navigation apparatus skips the road data generation process of step ST307.

The navigation apparatus then carries out a display control process (in step ST308). That is, the display control means 44 creates display data about a display in which the current position of the vehicle identified by the road matching means 42 and other information about the vehicle, including a route, a guide map, etc. which are created through processing not shown, are superimposed on the road map data read from the road-map-data storage means 43, and sends the display data to the display unit 5. After that, the navigation apparatus ends the regular processing.

Next, the details of the unregistered road detection process carried out in above-mentioned step ST305 will be explained with reference to a flow chart shown in FIG. 4 and explanatory diagrams shown in FIGS. 5 to 9.

In the unregistered road detection process, the unregistered road detecting means 45 checks to see whether a detection start point (i.e., a point A) for an unregistered road has not been set up yet (in step ST401). In this step ST401, when determining that the detection start point (i.e., the point A) has not been set up yet, the unregistered road detecting means carries out a vehicle departure judgment process (in step ST402). In this vehicle departure judgment process, the unregistered road detecting means 45 determines that the vehicle has started departing from any registered road when the identification state indicated by the matching result data sent from the road matching means 42 changes from the matching state to the free state. Otherwise, the unregistered road detecting means 45 does not determine that the vehicle has started departing from any registered road.

On the basis of the judgment result in above-mentioned step ST402, the unregistered road detecting means 45 then checks to see whether the vehicle has started departing from any registered road (in step ST403). In this step ST403, when determining that the vehicle has started departing from any registered road, the unregistered road detecting means 45 creates a history of candidates for the detection start point for an unregistered road (in step ST406). That is, the unregistered road detecting means 45 records, as a history of candidates for the detection start point for an unregistered road, the output of the positioning means 41 and the output of the road matching means 42 every time when the vehicle travels a certain distance so that the unregistered road detecting means 45 can carry out a detection start point setting process in step ST404 when the matching result data sent from the road matching means 42 indicates that the identification state is the matching state, as shown in FIG. 6a. Historical data recorded as the history of candidates for the detection start point for an unregistered road include a start point history ID, times, positioning results, and road matching results, as shown in FIG. 6b. The position, direction, velocity, and traveled distance, angle of turning of the vehicle, the GPS electric wave reception state, etc., which are sent, as the positioning data, from the positioning means 41, are included in the positioning results. The position and direction of the vehicle, road matching state, road data, etc., which are sent, as the matching result data, from the road matching means 42, are included in the road matching results. After that, the navigation apparatus ends the unregistered road detection process.

In contrast, when, in above-mentioned step ST403, determining that the vehicle has started departing from any registered road, the unregistered road detecting means 45 sets up the detection start point for an unregistered road (in step ST404). That is, the unregistered road detecting means 45 defines, as the detection start point, a point A which is located backwardly at a predetermined distant or longer from a certain point (i.e., a vehicle departure point at which the vehicle started departing from a registered road, or a point A") on the registered road at which the vehicle was traveling at a time when the identification state was the matching state (actually, an incorrect matching state) just before the identification state has changed to the free state, as shown in FIG. 5. The navigation apparatus then initializes a traveling path (in step ST405). That is, the unregistered road detecting means 45 generates a start point and interpolation points of a traveling path from the history of candidates for the detection start point created in step ST406. The start point is a point corresponding to the detection start point (i.e., the point A), and each interpolation point is a point which satisfies conditions shown in FIG. 7a which will be mentioned below. After that, the navigation apparatus ends the unregistered road detection process.

Figure 7A:
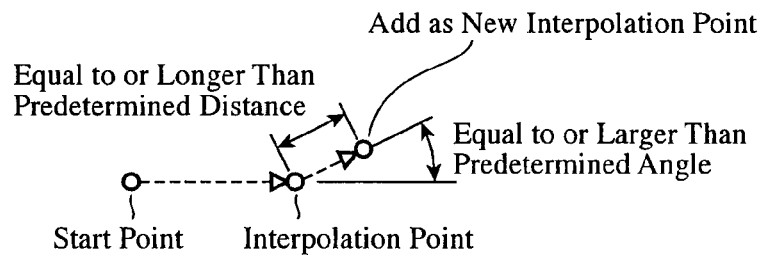
FIG. 7 is a diagram showing a method of setting up an interpolation point of a traveling path in the navigation apparatus in accordance with embodiment 1 of the present invention.
Figure 7B:
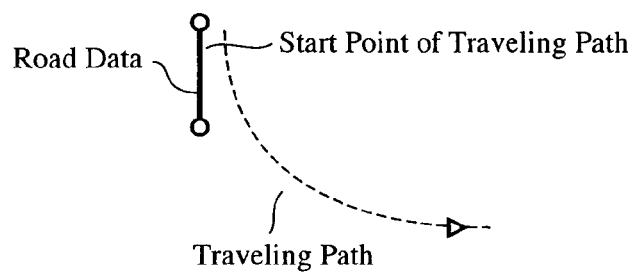
Figure 7C:
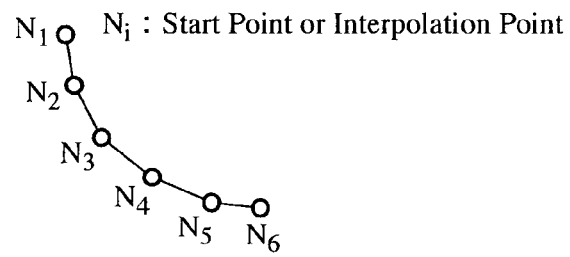

When, in above-mentioned step ST401, determining that the detection start point (i.e., the point A) for an unregistered road has been set up, the unregistered road detecting means 45 then creates a traveling path (in step ST407). That is, when the vehicle has traveled a predetermined distance or longer from the previous interpolation point on the already-created traveling path and has turned a predetermined angle or more, as shown in FIG. 7a, the unregistered road detecting means 45 sets up a new interpolation point using the positioning data from the positioning means 41 and the matching result data from the road matching means 42. Thus, by setting up interpolation points in turn, the unregistered road detecting means creates a traveling path as shown by a dashed line in FIG. 7b. As shown in FIG. 7c, the unregistered road detecting means creates a traveling path by carrying out a polygonal-line approximation process of connecting straight lines which connect the start point N1 and the interpolation points N2 to N6 in turn with one another.

The navigation apparatus then carries out a detection end judgment process (in step ST408). That is, the unregistered road detecting means 45 judges whether to end the detection process when the matching state indicated by the matching result data sent from the road matching means 42 has continued while the vehicle has traveled a predetermined distance or longer. Otherwise, the unregistered road detecting means 45 does not determine that it should the detection process. On the basis of the judgment result in above-mentioned step ST408, the unregistered road detecting means 45 then checks to see whether or not the detection process should be ended (in step ST409). When, in this step ST409, determining that the detection process should be ended, the unregistered road detecting means 45 ends the unregistered road detection process.

Figure 8:
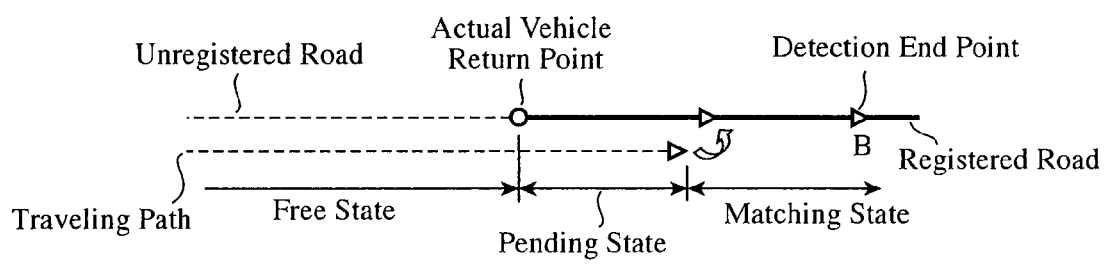
FIG. 8 is a diagram showing a positional relationship between the detection end point for the unregistered road, and points at which the state of the identification of the current position of a vehicle has changed from a free state to a pending state and then to a matching state in the navigation apparatus in accordance with embodiment 1 of the present invention.

In contrast, when, in this step ST409, not determining that the unregistered road detecting means 45 should end the detection process, it then sets up a detection end point (in step ST410). That is, the unregistered road detecting means 45 sets up, as the detection end point (i.e., a point B), the coordinates of the current position of the vehicle on a registered road which the road matching means 42 has identified, as shown in FIG. 8. FIG. 8 shows a positional relationship between the detection end point (i.e., the point B) for an unregistered road and points where the state of the identification carried out by the road matching means 42 has changed in turn from the free state to the pending state, and then to the matching state.

The navigation apparatus then performs a coordinate transformation on the coordinates of the traveling path (in step ST411). That is, as shown in FIG. 9a, the unregistered road detecting means 45 performs parallel translation on the traveling path so that the start point of the traveling path containing the unregistered road has coordinates which match with the coordinates of the detection start point (i.e., the point A) for the unregistered road, and, after that, carries out an affine transformation (expansion and contraction, and rotational movement) so that the end point of the traveling path has coordinates which match with the coordinates of the detection end point (i.e., the point B) for the unregistered road. As a result, a traveling path including the unregistered road as shown in FIG. 9b can be generated. The affine transformation is carried out according to the following equations. If each of the amount of movement in the coordinate system, the expansion and contraction coefficient, and the rotation angle of the traveling path, which are caused by the affine transformation, falls within a predetermined range which is estimated from the accuracy of the current position of the vehicle, the accuracy of correction of the angular velocity sensor 2, and the accuracy of correction of the velocity sensor 3, it can be considered that the detection of the unregistered road has succeeded. In contrast, if either one of the amount of movement in the coordinate system, expansion and contraction coefficient, and rotation angle of the traveling path, which are caused by the affine transformation, does not fall within the predetermined range, it can be considered that the detection of the unregistered road has ended in failure.

$$S=|P_{F2}-P_0|/|P_{F1}-P_0|$$

$$\alpha=\tan^{-1}\{(y_{F2}-y_0)/(x_{F2}-x_0))\}-\tan^{-1}\{(y_{F1}-y_0)/(x_{F1}-x_0)\}[\text{rad}]$$

$$x_{N2}=S\{(x_{N1}-x_0)\cos\alpha-(y_{N1}-y_0)\sin\alpha\}+x_0$$

$$y_{N2}=S\{(x_{N1}-x_0)\sin\alpha+(y_{N1}-y_0)\cos\alpha\}+y_0$$

where S: the expansion-and-contraction coefficient, $\alpha$: the rotation angle (having a positive sign when expressed in a clockwise direction, and a negative sign when expressed in an anticlockwise direction) [rad]

$P_0$: the start point $(x_0, y_0)$ $P_{F1}, P_{F2}$: the yet-to-be-corrected end point $(x_{F1}, y_{F1})$, and the corrected end point $(x_{F2}, y_{F2})$ $x_0, y_0$: the x and y coordinates of the start point [m]

$x_{F1}, y_{F1}$: the x and y coordinates of the yet-to-be-corrected end point [m]

$x_{F2}, y_{F2}$: the x and y coordinates of the corrected end point [m]

The unregistered road detecting means 45 then detects sections in each of which the traveling path and a registered road overlaps (in step ST412). That is, the unregistered road detecting means 45 projects an arbitrary point on a registered road (shown by a solid line) onto straight lines which connect among the interpolation points of the traveling path, as shown in FIG. 9b, on which an affine transformation has been performed, by tracing the traveling path from the point A along the traveling direction, and also tracing the traveling path from the point B along the direction opposite to the traveling direction, as shown in FIG. 9c, determines whether or not the distance between the arbitrary point and the traveling path is equal to or shorter than a predetermined value, and determines that the traveling path (shown by a dashed line) overlaps the registered road when the distance between the arbitrary point and the traveling path is equal to or shorter than the predetermined value. The unregistered road detecting means 45 thus deletes any section of the traveling path which overlaps a registered road. The unregistered road detecting means 45 then detects points where the upstream and downstream sections of the traveling path which overlap registered roads, respectively, are disconnected from the remaining traveling path, and defines them as a vehicle departure point (i.e., a point A') and a vehicle return point (i.e., a point B'), respectively. After that, when the length of the remaining traveling path, i.e., the distance between the vehicle departure point (or the point A') and the vehicle return point (or the point B') is equal to or longer than a predetermined distance, as shown in FIG. 9d, the unregistered road detecting means 45 determines that the detection of the unregistered road has succeeded and detects the coordinates of the unregistered road from the coordinates of the remaining traveling path. In contrast, when the length of the remaining traveling path is shorter than the predetermined distance, the unregistered road detecting means 45 determines that the detection of the unregistered road has ended in failure. Furthermore, the unregistered road detecting means 45 can be so constructed as to determine whether there is similarity between the shape of each of the registered roads and that of the traveling path and whether there is consistency between the location of each of the registered roads and that of the traveling path so as to detect the point A' and/or point B' when being unable to trace the registered roads up to the point A' and/or point B'.

On the basis of both the judgment results in above-mentioned steps ST411 and ST412, the unregistered road detecting means 45 then checks to see whether the detection of the unregistered road has succeeded (in step ST413). When, in this step ST413, determining that both the judgment results indicate that the detection of the unregistered road has succeeded, the unregistered road detecting means 45 calculates the coordinates of the unregistered road (in step ST414). In contrast, when, in step ST413, determining that at least one of the judgment results indicates that the detection of the unregistered road has ended in failure, the unregistered road detecting means 45 skips the process of step ST414. The unregistered road detecting means 45 then clears the detection start point and detection end point for the unregistered road (in step ST415). As a result, the unregistered road detecting means 45 places its state to a state in which it can detect another unregistered road. After that, the unregistered road detecting means 45 ends the unregistered road detection process.

As previously explained, the navigation apparatus in accordance with embodiment 1 of the present invention defines, as a detection section for an unregistered road, a section between two points respectively on registered roads in which the state of the identification of the current position of the vehicle is the matching state, the two points being respectively located before and behind sections in which the state of the identification is the free state, that is, a section between a detection start point (or a point A) and a detection end point (or a point B), performs a coordinate transformation on a traveling path between the two points which is estimated regardless of processing carried out by the road matching means 42 so that the start point and end point of the traveling path have coordinates which match with the coordinates of the two points, respectively, determines that sections of the traveling path which are similar to parts of the registered roads, respectively, and which are running in parallel with the parts of the registered roads overlap the registered roads, respectively, and removes the sections of the traveling path from the traveling path, and then detects the coordinates of the unregistered road from the remaining traveling path. Therefore, the navigation apparatus in accordance with embodiment 1 of the present invention can improve the probability of succeeding in the detection of an unregistered road, and can detect the coordinates of the unregistered road with a higher degree of accuracy. As a result, the navigation apparatus in accordance with embodiment 1 of the present invention can carry out route searching and route guidance on the basis of the road data including data about unregistered roads.

In accordance with a prior art navigation apparatus, when the vehicle equipped with the navigation apparatus enters a bypass which is an unregistered road from a main line, the current position of the vehicle may continue to be identified as being on the main line, and the identified current position of the vehicle may be amended so that it is on the bypass after the current position of the vehicle is greatly distant from the actual current position of the vehicle on the bypass. Therefore, even if such a prior art navigation apparatus starts detection of an unregistered road immediately after the vehicle has departed from a main line, it may detect, as a vehicle departure point, a position which is distant from the position where the vehicle has departed from the main line actually. In contrast, the navigation apparatus according to embodiment 1 starts detection of an unregistered road from a point A which is backwardly at a predetermined distance from the coordinates of a point on a registered road at which the vehicle was traveling immediately before the identification state shown by the matching result data from the road matching means 42 has changed from the matching state to the free state. Therefore, even if the road matching means 42 continues to incorrectly identify the current position of the vehicle as being on a registered road although the vehicle has already begun to travel along an unregistered road, the navigation apparatus according to embodiment 1 can detect the point where the unregistered road is connected to the registered road, i.e., the vehicle departure point (or the point A') correctly.

In addition, in the navigation apparatus in accordance with this embodiment 1, when it is required of the road matching means 42 that the matching state should show long continuity so that incorrect detection of a traveling path including an unregistered road section is not carried out, because the setup of the detection start point (point A) or the detection endpoint (point B) is delayed, a long traveling path which overlaps registered roads is created, and the points of an unregistered road connected to the registered roads are found incorrectly when the coordinates of the unregistered road are determined from the created traveling path, sections of the traveling path which overlap the registered roads are removed from the traveling path. As a result, even if the vehicle travels along a traveling path including long registered road sections and an unregistered road section, the navigation apparatus can easily detect sections of the traveling path which overlap the registered roads and the vehicle departure point (point A') and the vehicle return point (point B') where the unregistered road is connected to the registered roads, respectively. Furthermore, because the navigation apparatus can set up points A and B where the road matching means is securely placed in the matching state on registered roads which are distant from the points A' and B' where the unregistered road are connected to the registered roads, respectively, the navigation apparatus can improve the probability of succeeding in the detection of the unregistered road.

Embodiment 2

Figure 10A:
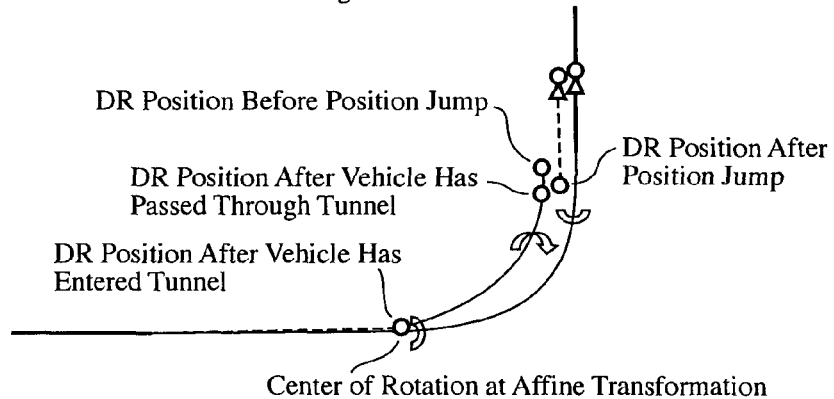
FIG. 10 is a diagram showing a procedure for connecting portions into which the traveling path is separated due to a position jump which occurs immediately after the vehicle has passed through a tunnel into a single traveling path, in a navigation apparatus in accordance with embodiment 2 of the present invention.

In the navigation apparatus according to above-mentioned embodiment 1, when the vehicle passes through an unregistered tunnel while an error occurs in the bias of the angular velocity sensor 2, any bias drift cannot be corrected for on the basis of the GPS signal from the GPS receiver 1 and the road data read from the road-map-data storage means 43. Therefore, in such a case, an error of the traveling direction of the vehicle and an error of the position of the vehicle increase gradually, and, when the GPS signal is acquired from the GPS receiver 1 immediately after the vehicle has passed through an unregistered tunnel, the current position of the vehicle is amended on the basis of this GPS signal. In this case, because a "position jump" occurs and the traveling path is then separated into portions immediately after the vehicle has passed through the tunnel, as shown in FIG. 10*a*, the generation of road data using the coordinates of the traveling path in the state where the traveling path is separated into portions, the shape and coordinates of the unregistered road on the basis of the road data will be inaccurately determined.

To solve this problem, a navigation apparatus in accordance with this embodiment 2 is so constructed as to be able to accurately detect the coordinates of an unregistered road from a traveling path of the vehicle even if the unregistered road includes a continuation section in which GPS electric waves are shielded, like a tunnel, in the course thereof, and the navigation apparatus makes a position correction to the traveling path so that the traveling path becomes discontinuous immediately after the vehicle has passed through the continuation section in which GPS electric waves are shielded.

Figure 10B:
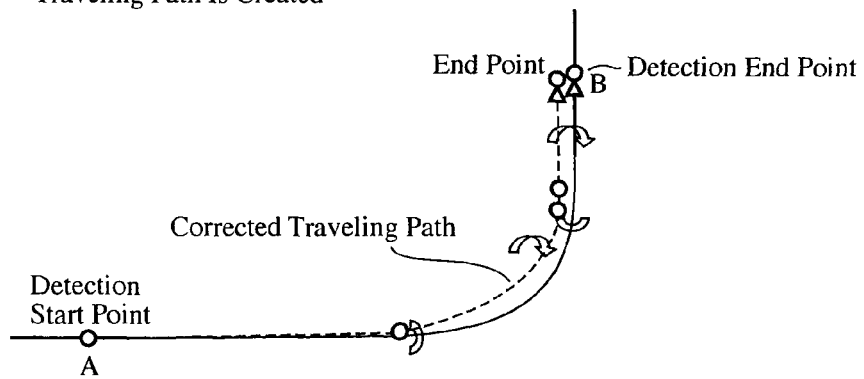
Figure 10C:
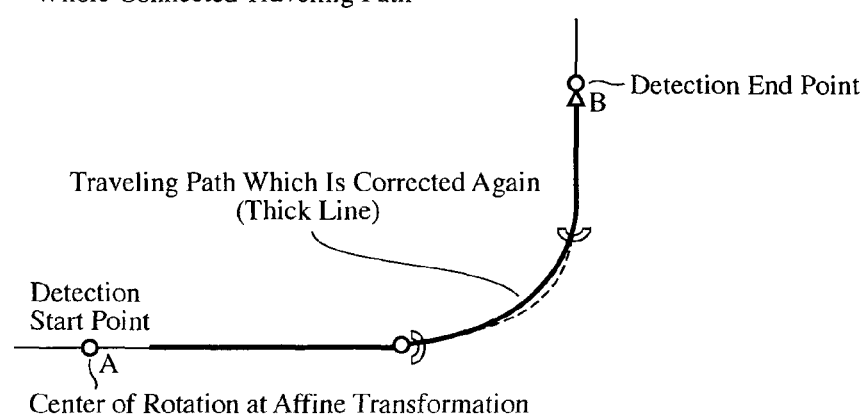

In the navigation apparatus according to this embodiment 2, an unregistered road detecting means 45 records the traveled distance of the vehicle and the shield state of GPS electric waves (or a GPS electric wave reception state) while associating them with the traveling path of the vehicle, and, immediately after the vehicle has passed through a continuation section in which GPS electric waves are shielded, compares the amount of updates of the coordinates of the traveling path with the traveled distance of the vehicle which is calculated on the basis of a velocity signal from a velocity sensor 3 so as to check the continuity of the traveling path. When the difference between the amount of updates of the coordinates of the traveling path and the traveled distance of the vehicle is equal to or larger than a predetermined value, as shown in FIG. 10*a*, the unregistered road detecting means 45 determines that the traveling path has been separated into portions. As shown in FIG. 10*b*, the unregistered road detecting means 45 then carries out a correction process of performing a coordinate transformation on only an upstream one of the portions into which the traveling path has been separated by defining, as the center of rotation of an affine transformation, the entrance point of the tunnel first, so as to connect the upstream portion and a downstream one of the portions into which the traveling path has been separated into a single traveling path. After that, the unregistered road detecting means 45 performs a coordinate transformation on the whole traveling path by defining, as the center of rotation of an affine transformation, a point A so that the start point and end point of the whole traveling path have coordinates which match with the coordinates of a detection start point (i.e., the point A) and those of an end detection point (i.e., a point B), respectively, as shown in FIG. 10*c*. After that, the unregistered road detecting means 45 calculates the coordinates of the unregistered road through the same processing as that explained in embodiment 1.

As previously explained, even if the accuracy of position degrades when the vehicle travels through a section in which GPS electric waves are shielded and the traveling path is separated into portions, the navigation apparatus in accordance with embodiment 2 of the present invention partially performs a coordinate transformation only on an upstream separated section first so as to connect the separated upstream section and a remaining section into a single traveling path, and, after that, performs a coordinate transformation on the whole traveling path so that the whole traveling path agrees with the coordinates of a registered road between the detection start point (point A) and the end detection point (point B). Therefore, the navigation apparatus in accordance with embodiment 2 of the present invention can improve the probability of succeeding in the detection of an unregistered road at a time when the vehicle has traveled a section in which GPS electric waves are shielded, and the accuracy of the coordinates of the unregistered road.

Embodiment 3

Figure 11:
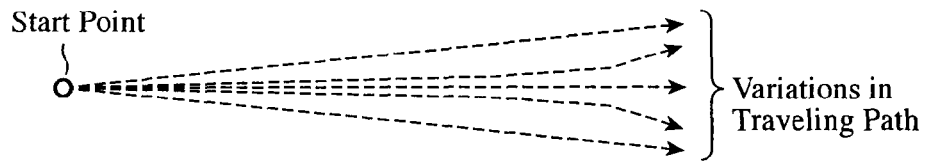
FIG. 11 is a diagram showing occurrence of a phenomenon in which the coordinates of a traveling path have variations when the vehicle travels along an identical unregistered road a plurality of times, in a navigation apparatus in accordance with embodiment 3 of the present invention.
Figure 12:
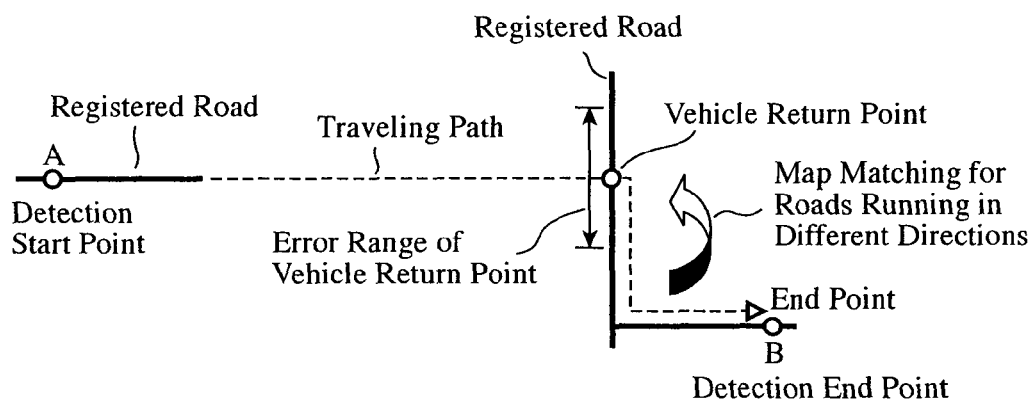
FIG. 12 is a diagram for explaining a setup of a detection end point for an unregistered road at a time when the state of the identification of the current position of the vehicle changes to a matching state while the vehicle is traveling along one of registered roads running in two different directions after the vehicle has passed the unregistered road, in the navigation apparatus in accordance with embodiment 3 of the present invention.

As shown in FIG. 11, even if the vehicle travels an identical road several times, there is a possibility that the coordinates of the traveling path of the vehicle have variations resulting from errors in the velocity sensor 3, the angular velocity sensor 2, and the GPS receiver 1, and the coordinates of a vehicle return point (or a point B') where an unregistered road is connected to a registered road have an error range extending in the direction of the registered road, as shown in FIG. 12. To solve this problem, in the navigation apparatus according to embodiment 1, the unregistered road detecting means 45 defines, as the point B, the coordinates of the current position of the vehicle which the road matching means 42 has identified as being on a registered road in step ST410 of FIG. 4, as to a timing of setting up the detection end point (or the point B) by means of the unregistered road detecting means 45.

In contrast, in a navigation apparatus according to this embodiment 3, when a vehicle equipped with the navigation apparatus has made a right or left turn, an unregistered road detecting means 45 sets up a detection end point (or a point B) if the matching state has been continuing while the vehicle has been traveling a predetermined distance or longer along a registered road running in a direction before the vehicle has made the right or left turn, and the matching state will continue while the vehicle will be traveling a predetermined distance or longer along a registered road running in a different direction after the vehicle has made the right or left turn.

Thus, when the matching state had continued while the vehicle had traveled a predetermined distance or longer before the vehicle made a right or left turn, and, after that, the matching state has continued while the vehicle has traveled a predetermined distance or longer after the vehicle made the right or left turn, the navigation apparatus in accordance with this embodiment 3 defines, as the detection end point (or the point B), the coordinates of the current position of the vehicle on a registered road. Therefore, the navigation apparatus can accurately detect the coordinates of any registered road to which the unregistered road is connected even if the coordinates of the traveling path have variations as shown in FIG. 11.

Embodiment 4

In the navigation apparatus according to above-mentioned embodiment 1, when an error occurs in the traveling direction of the vehicle estimated by the positioning means 41, the road matching means 42 judges easily and incorrectly that the vehicle has departed from a registered road, and, as a result, the frequency with which an unregistered road is created incorrectly increases. Thus, when the frequency with which an unregistered road is created incorrectly increases, the user needs to delete information about such an unregistered road from the navigation apparatus frequently and if the user is later for the deletion of the information, there arises a case in which any further unregistered road cannot be registered because of a lack of the storage capacity of the road-map-data storage means 43 when the user desires to add an unregistered road truly. A navigation apparatus according to this embodiment 4 is provided in order to solve this problem, and is so constructed as not to determine that, even if an error occurs in the traveling direction of the vehicle estimated by a positioning means 41 while the vehicle travels along a registered road, the vehicle has traveled along a road other than registered roads, thereby preventing incorrect detection of any traveling path including an unregistered road.

Figure 4:
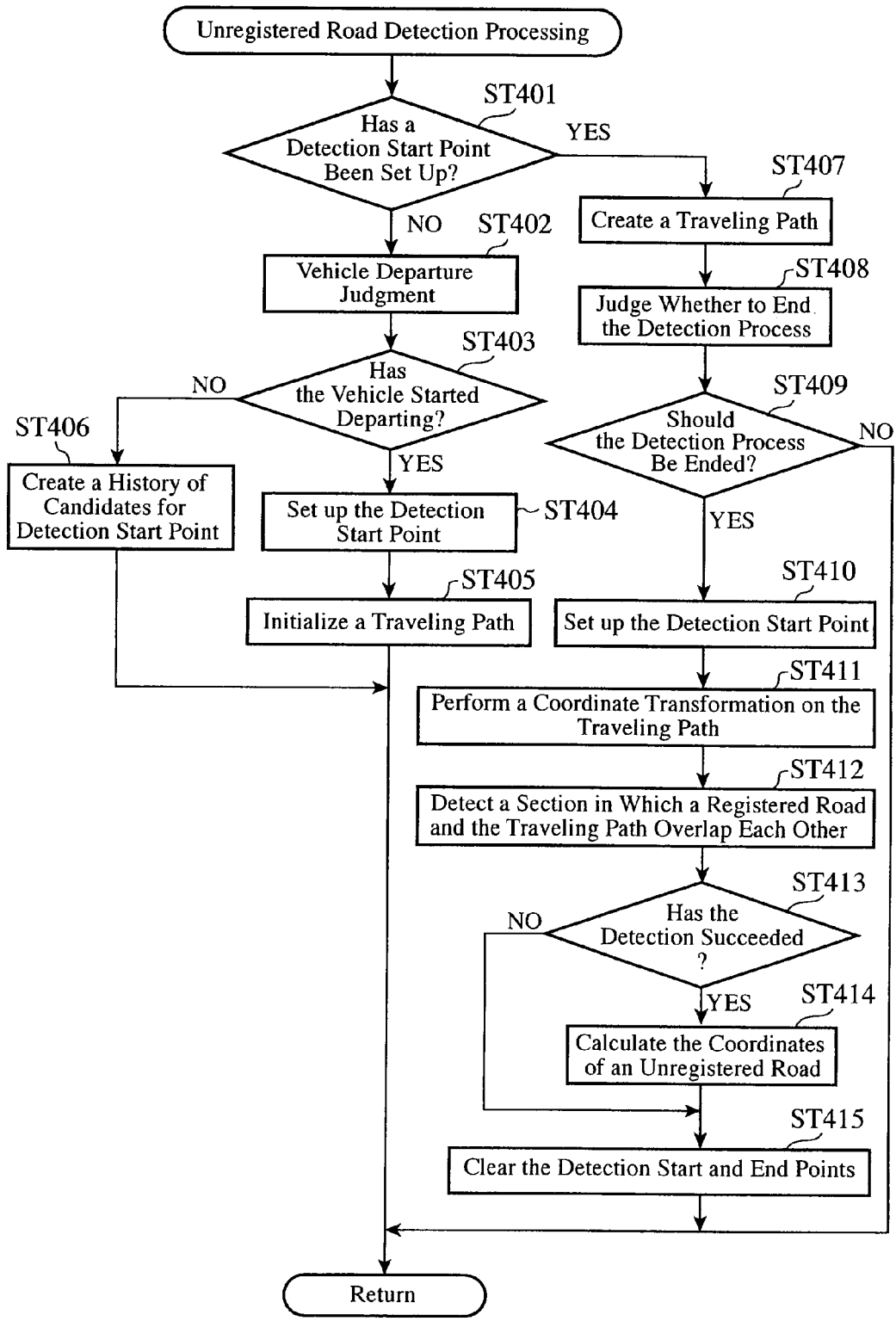
FIG. 4 is a flow chart showing the details of an unregistered road detection process of the regular processing carried out by the navigation apparatus in accordance with embodiment 1 of the present invention.

That is, in the navigation apparatus according to embodiment 1, as to a timing of setting the detection end point (or the point B) by means of the unregistered road detecting means 45, the unregistered road detecting means 45, in step ST402 of FIG. 4, determines that the vehicle has started departing from a registered road when the identification state indicated by the matching result data from the road matching means 42 changes from the matching state to the free state, and, in step ST404, defines, as the detection start point, a point which is located backwardly at a predetermined distant or longer from a point on the registered road at which the vehicle was traveling at a time when the identification state was the matching state immediately before the identification state has changed to the free state, i.e., a vehicle departure point (or a point A") on the registered road.

Figure 13A:
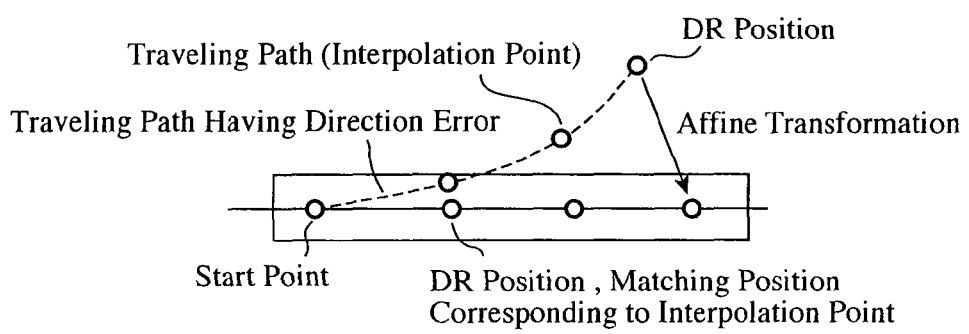
FIG. 13 is a diagram for explaining a judgment method of judging a vehicle departure point by taking direction errors of a positioning means into consideration in a navigation apparatus in accordance with embodiment 4 of the present invention.
Figure 13B:
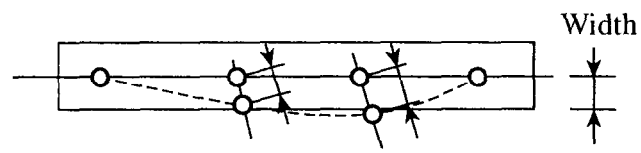

In contrast, in the navigation apparatus according to embodiment 4, when matching result data from a road matching means 42 indicates that the state of the identification of the current position of the vehicle is a matching state, an unregistered road detecting means 45 performs a coordinate transformation on a traveling path having a predetermined distance, as shown in FIG. 13a, and calculates the distance between each of a DR position and interpolation points, and a corresponding one of matched positions on a registered road which respectively correspond to the DR position and interpolation points from the coordinate-transformed traveling path, as shown in FIG. 13b. The unregistered road detecting means 45 then compares the calculated distance with the width of the registered road so as to check to see whether the traveling path falls within a region defined by the road width, and, when determining that the traveling path does not fall within the region defined by the road width, defines, as the vehicle departure point (or the point A"), the coordinates of the current position of the vehicle, and further defines, as a detection start point A, a point on the registered road which is located backwardly at a predetermined distant or longer from the point A".

As previously explained, the navigation apparatus according to embodiment 4 is so constructed as to perform a coordinate transformation on a traveling path having a predetermined distance to judge whether the coordinate-transformed traveling path falls within a region defined by the width of a registered road along which the vehicle is traveling, and to set up the vehicle departure point (or the point A") and the detection start point (or the point A) on the basis of this judgment result. Therefore, the navigation apparatus according to embodiment 4 can detect an actual vehicle departure point (or a point A') with a higher degree of accuracy. Furthermore, even if the traveling direction of the vehicle differs from the direction of a registered road due to an error which occurs in the traveling direction of the vehicle estimated by the positioning means 41 from a lack of the correction of errors of a velocity sensor 3 and an angular velocity sensor 2 and errors of a GPS receiver 1 when the vehicle is traveling along the registered road, the navigation apparatus according to embodiment 4 determines that the identification state is the matching state if the traveling path falls within a region defined by the width of the registered road. Therefore, the navigation apparatus according to embodiment 4 can decrease the frequency with which an unregistered road is created incorrectly, and can also reduce the number of times that the user has to delete information about an unregistered road created incorrectly.

Embodiment 5

In the navigation apparatus according to above-mentioned embodiment 1, as to a timing of setting the detection end point (or the point B) by means of the unregistered road detecting means 45, the unregistered road detecting means 45, in step ST408 of FIG. 4, determines that it should end the detection of an unregistered road when the road matching means 42 has continued to be placed in the matching state while the vehicle has been traveling a predetermined distance or longer, and, in step ST410, defines, as the point B, the coordinates of the current position of the vehicle which the road matching means 42 has identified as being on a registered road.

Figure 14:
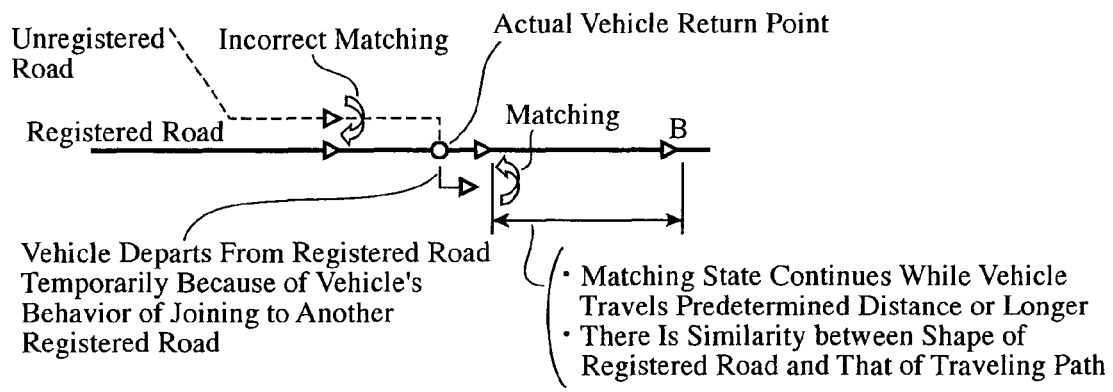
FIG. 14 is a diagram for explaining a method of setting up a detection end point for an unregistered road in a navigation apparatus in accordance with embodiment 5 of the present invention.

In contrast, in a navigation apparatus according to embodiment 5, as shown in FIG. 14, a condition that there must be similarity between the shape of the traveling path of the vehicle and that of a registered road over a predetermined distance or longer while the state of the identification of the current position of the vehicle is a matching state is added to conditions for a judgment process in step ST408 of judging whether the detection of an unregistered road should be ended. When this condition is satisfied, a road matching means 42 defines, as a detection endpoint (or a point B), the coordinates of the current position of the vehicle which it has identified as being on the registered road.

In the navigation apparatus in accordance with this embodiment 5, even if the unregistered road detecting means 45 carries out map matching incorrectly so as to draw the current position of the vehicle which it has estimated as being in the vicinity of a registered road toward the registered road when the road matching means 42 shows that the state of the identification of the current position of the vehicle is a free state, the unregistered road detecting means 45 defines, as the detection end point (or the point B), the coordinates of the current position of the vehicle on a registered road about which it has recognized that there is similarity between the shape of the traveling path and that of the registered road and there is consistency between the location of the traveling path and that of the registered road over a predetermined distance or longer. Therefore, the navigation apparatus can carry out detection of the coordinates of any registered road to which the unregistered road is connected.

Embodiment 6

In the navigation apparatus according to above-mentioned embodiment 1, as to a timing of setting the detection end point (or the point B) by means of the unregistered road detecting means 45, the unregistered road detecting means 45, in step ST408 of FIG. 4, determines that it should end the detection of an unregistered road when the road matching means 42 has continued to be placed in the matching state while the vehicle has been traveling a predetermined distance or longer, and, in step ST410, defines, as the point B, the coordinates of the current position of the vehicle which the road matching means 42 has identified as being on a registered road.

Figure 15A:
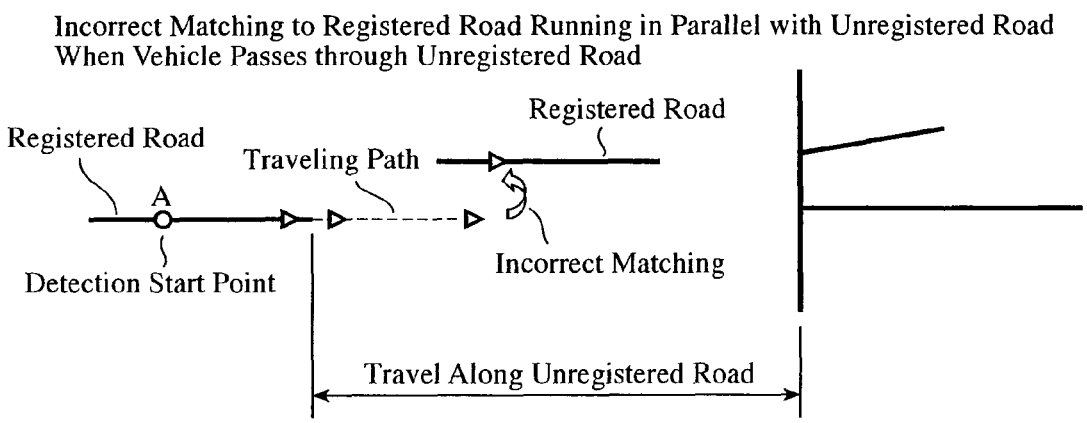
FIG. 15 is a diagram for explaining a state in which a road matching means incorrectly matches the current position of the vehicle onto a registered road which is running in parallel with and in the vicinity of an unregistered road, and a method of judging whether a setup of a detection end point can be carried out using an unregistered road detecting means, in a navigation apparatus in accordance with embodiment 6 of the present invention.
Figure 15B:
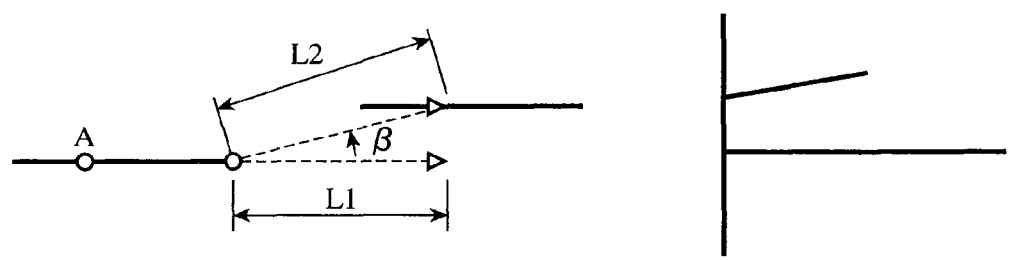

In contrast, in a navigation apparatus according to embodiment 6, as shown in FIG. 15a, when the state of the identification of the current position of the vehicle changes in turn from a matching state to a free state, to a pending status, and then to the matching state while the vehicle travels along a registered road before and behind passing through an unregistered road section, a road matching means 42 defines, as a detection end point (or a point B), the coordinates of the current position of the vehicle which it has identified as being on a registered road on the condition that there is consistency between the shape and coordinates of a traveling path created from a point A on a registered road along which the vehicle traveled before entering the unregistered road section and those of a registered road along which the vehicle has traveled after exiting the unregistered road section within a specified positional limit (e.g., L1, L2, and beta which are shown in FIG. 15b have a predetermined relation among them) which is estimated from a precision in the distance obtained from a signal of a velocity sensor 3 or a precision in the angle of turning obtained from a signal of an angular velocity sensor 2.

In the navigation apparatus in accordance with this embodiment 6, even if the unregistered road detecting means 45 carries out map matching incorrectly so as to draw the current position of the vehicle which it has estimated as being in the vicinity of a registered road toward the registered road when the road matching means 42 shows that the identification state is the free state, the unregistered road detecting means 45 defines, as the detection end point (or the point B), the coordinates of the current position of the vehicle on a registered road about which it has recognized that there is similarity between the shape of the traveling path and that of the registered road and there is consistency between the location of the traveling path and that of the registered road over a predetermined distance or longer. Therefore, the navigation apparatus can carry out detection of the coordinates of any registered road to which the unregistered road is connected.

Embodiment 7

In the navigation apparatus according to above-mentioned embodiment 1, in a case in which a position error of more than a predetermined value occurs in the traveling direction of the vehicle while the vehicle is traveling along a straight line section of a registered road, if, after that, the vehicle makes a right or left turn at an intersection in the registered road, the state of the identification of the current position of the vehicle changes from the matching state to the free state and incorrect detection of an unregistered road is started because the traveling direction of the vehicle which has been estimated at a location which is assumed to be different from the intersection changes. As a result, the frequency with which an unregistered road is created incorrectly increases. Thus, when the frequency with which an unregistered road is created incorrectly increases, the user needs to delete information about such an unregistered road from the navigation apparatus frequently and if the user is later for the deletion of the information, there arises a case in which any further unregistered road cannot be registered because of a lack of the storage capacity of the road-map-data storage means 43 when the user desires to add an unregistered road truly. A navigation apparatus according to this embodiment 7 is provided in order to solve this problem, and is so constructed as to prevent automatically creation of unnecessary road data at a time when the vehicle makes a right or left turn even if a position error occurs in the traveling direction of the vehicle while the vehicle is traveling along a straight line section of a registered road.

That is, in the navigation apparatus according to above-mentioned embodiment 1, as to creation of road data about an unregistered road from the traveling path from which portions which overlap registered roads are deleted, the unregistered road detecting means 45, in step ST412 of FIG. 4, deletes any portion of the traveling path which overlaps a registered road, and, when the length of the remaining traveling path is equal to or longer than a predetermined distance, determines that the detection of the unregistered road has succeeded and then detects the coordinates of the unregistered road from the coordinates of the remaining traveling path, whereas when the length of the remaining traveling path is shorter than the predetermined distance, the unregistered road detecting means determines that the detection of the unregistered road has ended in failure.

Figure 16:
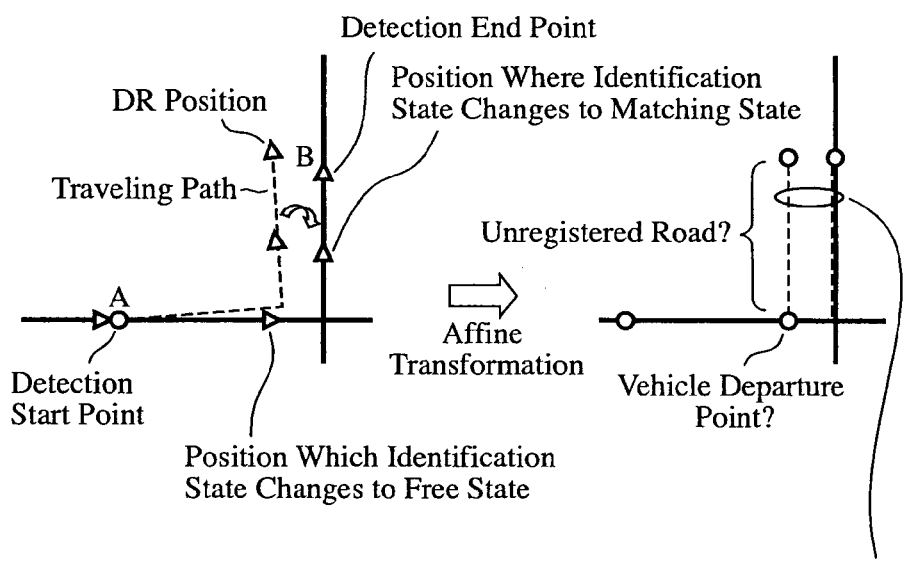
FIG. 16 is a diagram for explaining a method of judging whether road data can be created in a case in which the state of identification of the current position of the vehicle changes from a matching state to a free state at a time when the vehicle makes a right or left turn, in a navigation apparatus in accordance with embodiment 7 of the present invention.

In contrast, in a navigation apparatus according to embodiment 7, in a case in which at a location where an intersection exists in the vicinity of a point where the vehicle has made a right or left turn, as shown in FIG. 16, the state of the identification of the current position of the vehicle which is indicated by matching result data from a road matching means 42 changes from a matching state to a free state according to the right-turn or left-turn behavior of the vehicle, and, after that, returns to the matching state via a pending state, when a coordinate transformation (parallel translation, rotation, expansion and contraction) is performed on the traveling path within limits of an amount of movement in a coordinate system, an expansion-and-contraction coefficient and a rotation angle of the traveling path which are estimated from the accuracy of the current position of the vehicle, the accuracy of correction of an angular velocity sensor 2, and the accuracy of correction of a velocity sensor 3, an unregistered road detecting means 45 determines that the identification state has changed from the matching state to the free state according to the right-turn or left-turn behavior of the vehicle because of a position error which has occurred in the traveling direction of the vehicle when the vehicle has been traveling along the registered road, and cancels the detection of an unregistered road.

The navigation apparatus according to this embodiment 7 is so constructed as to determine whether or not a coordinate transformation (expansion and contraction) is performed on the traveling path within limits of the expansion-and-contraction coefficient of the traveling path which is estimated from the accuracy of the current position of the vehicle and the accuracy of correction of the velocity sensor 3. Therefore, it becomes difficult for the navigation apparatus to detect an unnecessary unregistered road. As a result, the user does not need to perform any operation of deleting an unnecessary unregistered road frequently.

Embodiment 8

In prior art navigation apparatus, in order to prevent incorrect matching, an interconnection between a highway and a local street is limited to a highway interchange (abbreviated as "IC" from here on), for example. For this reason, in a case in which a highway IC is an unregistered road, the state of the identification of the current position of the vehicle may not change to a matching state, but may remain being a pending state even if the current position of the vehicle is identified as being on a local street after the vehicle has departed downward from a highway toward the local street through the unregistered highway IC. In this case, because the setup of the detection end point for the unregistered road is delayed and hence portions of the traveling path which overlap registered roads become long, it becomes difficult to carry out detection of points where the unregistered road is respectively connected to the registered roads. A navigation apparatus in accordance with this embodiment 8 is made in order to solve this problem, and is so constructed as to detect an unregistered road even if a highway IC is the unregistered road.

That is, in the navigation apparatus according to abovementioned embodiment 1, as to a timing of setting the detection end point (point B) for an unregistered road using the unregistered road detecting means 45, the unregistered road detecting means 45, in step ST408 of FIG. 4, determines that it should end the detection of an unregistered road when the road matching means 42 continues to be placed in the matching state while the vehicle is traveling a predetermined distance or longer, and the road matching means 42, in step ST410, defines, as the point B, the coordinates of the current position of the vehicle which it has identified as being on a registered road.

Figure 17:
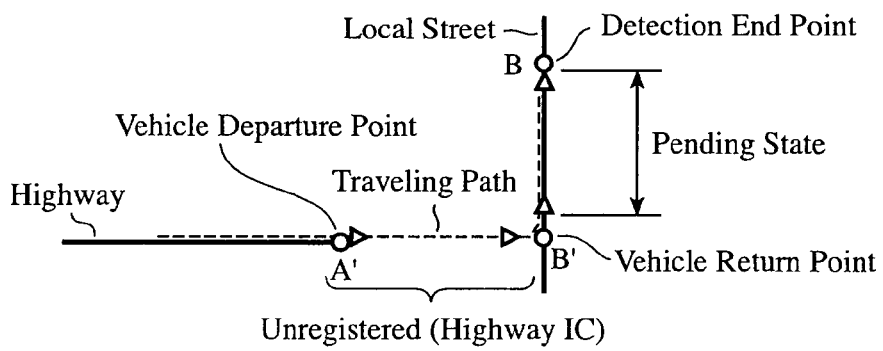
FIG. 17 is a diagram for explaining a method of setting up a detection end point for an unregistered road at a time when the vehicle has departed from a highway to enter a local street through an unregistered highway IC, in a navigation apparatus in accordance with embodiment 8 of the present invention.

In contrast, in a navigation apparatus according to embodiment 8, in a case, as shown in FIG. 17, in which when the vehicle has passed through an unregistered highway IC, and has entered a local street from a highway or has entered a highway from a local street, a road matching means 42 remains being placed in a pending state and therefore has not switched to any other state even if the vehicle has traveled a predetermined distance or longer along a registered road after passing through the highway IC, if the traveling path for which detection was started from a detection start point (or a point A) on another registered road along which the vehicle was traveling before the vehicle has entered the highway IC overlaps the registered road for which the identification state is the pending state while the vehicle is traveling a predetermined distance or longer, or if there is a registered road running in parallel with and in the vicinity of the traveling path of the vehicle, an unregistered road detecting means 45 sets up a detection end point (or a point B) on the registered road.

The navigation apparatus in accordance with this embodiment 8 can thus generate road data indicating an unregistered highway IC without changing the processing method and characteristics of the road matching means 43 of limiting an interconnection between a highway and a local street to a highway IC, for example, in order to prevent the navigation apparatus itself from incorrectly identifying the current position of the vehicle as being on a registered road.

Embodiment 9

When a highway IC or a highway junction (abbreviated as "JCT" from here on) is an unregistered road, the road matching means 42 is late for a setup of the detection end point for the traveling path because the vehicle will travel along a registered road with the road matching means being placed in the pending state without changing its identification state to the matching state even if the registered road which the vehicle will travel after traveling through the unregistered road overlaps the coordinates of the traveling path or there is a registered road running in parallel with and in the vicinity of the traveling path. Furthermore, when a registered road of the same road type which the road matching means 42 can easily connect to the traveling path is running in parallel with and in the vicinity of the traveling path, the road matching means incorrectly matches the current position of the vehicle onto the registered road. A navigation apparatus in accordance with this embodiment 9 is made in order to solve this problem, and is so constructed as to, even if a highway IC or a highway JCT is an unregistered road, judges the validity of connection between a local street and a highway, the validity of connection between local streets, and the validity of connection between highways according to the travel of the vehicle to detect the unregistered road.

That is, in the navigation apparatus according to abovementioned embodiment 1, as to a timing of setting the detection end point (point B) for an unregistered road using the unregistered road detecting means 45, the unregistered road detecting means 45, in step ST408 of FIG. 4, determines that it should end the detection of an unregistered road when the road matching means 42 continues to be placed in the matching state while the vehicle is traveling a predetermined distance or longer, and the road matching means 42, in step ST410, defines, as the point B, the coordinates of the current position of the vehicle which it has identified as being on a registered road.

Figure 18:
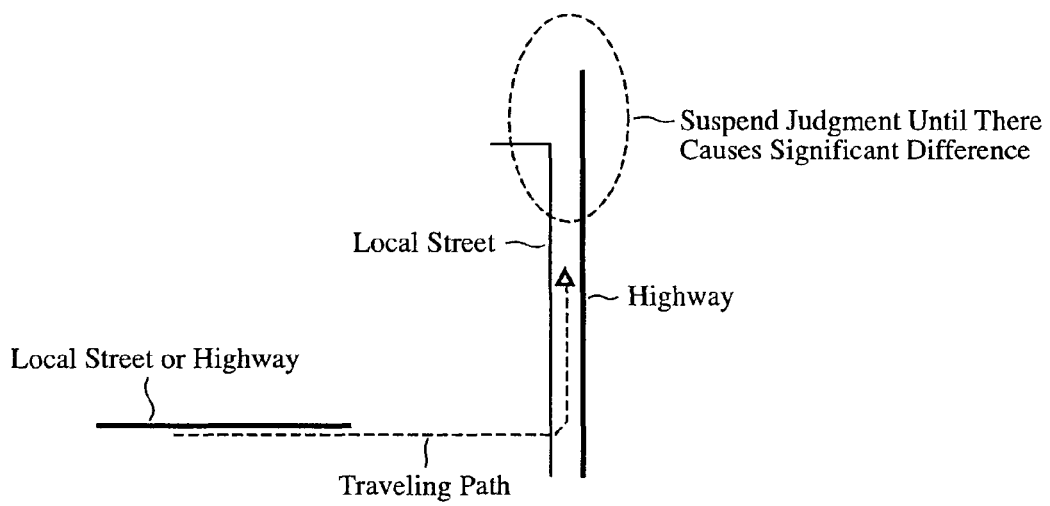
FIG. 18 is a diagram for explaining a method of setting up a detection end point for an unregistered road when it is determined that two road types of registered roads (e.g., a highway and a local street) are running in parallel with and in the vicinity of the traveling path of the vehicle after the vehicle has passed through an unregistered road, in a navigation apparatus in accordance with embodiment 9 of the present invention.

In contrast, a navigation apparatus according to embodiment 9 retrieves road data about a certain region in the vicinity of the traveling path for which detection was started from a point A on a registered road along which the vehicle was traveling before the vehicle has entered an unregistered road from a road-map-data storage means 43, as shown in FIG. 18, and, when being able to determine that both a highway and a local street are running in parallel with and in the vicinity of the traveling path, suspends the judgment irrespective of their road types and the state of the identification of the current position of the vehicle until there causes a remarkable significant difference between the similarity between the shape of the traveling path and that of the highway and the similarity between the shape of the traveling path and that of the local street, or between the consistency between the location of the traveling path and that of the highway and the consistency between the location of the traveling path and that of the local street, and, after that, sets up a detection end point (or a point B) on a registered road which the navigation apparatus has recognized has consistency with the traveling path when a significant difference appears between the similarities or consistencies.

In the navigation apparatus in accordance with this embodiment 9, in a case in which a highway IC or a highway JCT is an unregistered road, when a registered road having the same road type as another registered road which the vehicle has traveled before traveling the unregistered road is running in parallel with the traveling path and in the vicinity of the current position of the vehicle, the road matching means 42 may incorrectly match the current position of the vehicle onto the registered road, though the road matching means can detect a registered road which has a shape which matches with the shape of the traveling path regardless of the road type of the registered road even in this case.

Embodiment 10

If the driver stops the vehicle and turns off the engine of the vehicle in order to, for example, take a rest while he or she drives the vehicle along an unregistered road of a long distance, the navigation apparatus according to either one of above-mentioned embodiments cannot resume detecting the unregistered road after the driver turns on the engine of the vehicle. A navigation apparatus in accordance with this embodiment 10 is made in order to solve this problem, and is so constructed as to be able to resume the process of detecting an unregistered road after the engine of the vehicle is turned on even if the engine of the vehicle is turned off while the navigation apparatus detects a traveling path including the unregistered road.

In the navigation apparatus in accordance with the above-mentioned embodiment 1, no mention is made of a case in which the engine of the vehicle is stopped while the navigation apparatus sets up the detection start point (or the point A) for an unregistered road and then detects the unregistered road. In contrast, a navigation apparatus in accordance with this embodiment 10 is provided with a non-volatile memory (not shown), and, every time when a predetermined time elapses or when the vehicle travels a predetermined distance, stores various data about detection of an unregistered road in the non-volatile memory, as well as positioning data calculated by a positioning means 41 and matching result data calculated by a road matching means 42. When then determining that data indicating that the detection of an unregistered road had been being carried out before the engine was turned off is recorded in the non-volatile memory immediately after the engine is turned on, the navigation apparatus determines that there is no harm in resuming the detection of the unregistered road and resumes the detection of the unregistered road if the vehicle position which is received by a GPS receiver 1 after the engine is turned on falls within a predetermined region around the vehicle position which was detected before the engine was turned off. In contrast, if the vehicle position which is received by the GPS receiver 1 after the engine is turned on is out of the predetermined region around the vehicle position which was detected before the engine was turned off, the navigation apparatus determines that the vehicle has been moved by a ferry or the like while the engine of the vehicle is at rest and there is harm in resuming the detection of the unregistered road, and stops the detection of the unregistered road.

The navigation apparatus in accordance with this embodiment 10 can detect an unregistered road continuously even if the engine is turned off and then turned on. Therefore, for example, even if road data about a road having a length of more than tens of km is not registered in the road map data, the navigation apparatus can generate road data about the road.

Embodiment 11

Figure 20:
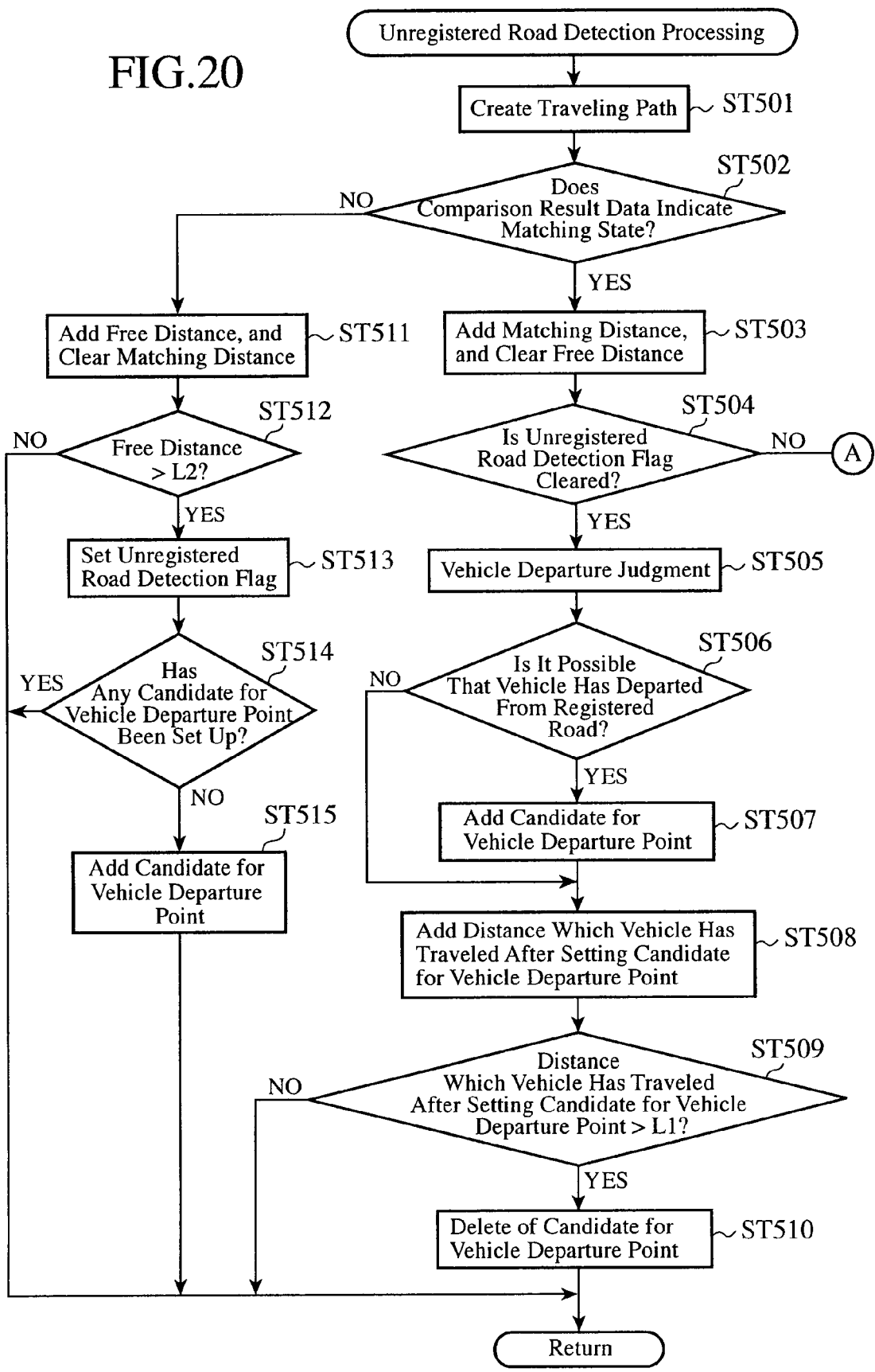
FIG. 20 is a flow chart showing the details of a first half of an unregistered road detection process of regular processing carried out by the navigation apparatus in accordance with embodiment 11 of the present invention.
Figure 21:
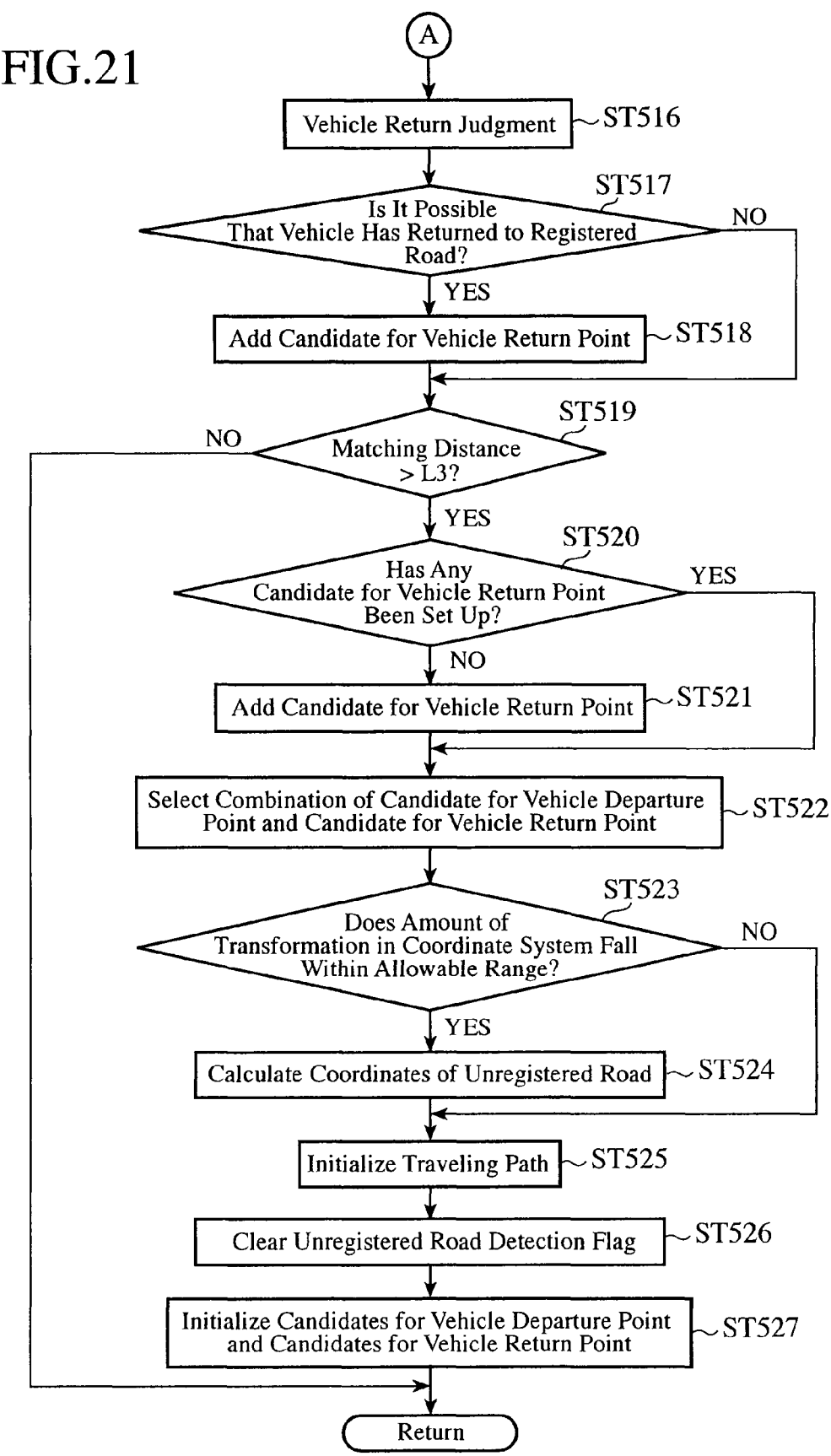
FIG. 21 is a flow chart showing the details of a second half of the unregistered road detection process of the regular processing carried out by the navigation apparatus in accordance with embodiment 11 of the present invention.

A navigation apparatus in accordance with this embodiment 11 differs from the navigation apparatus in accordance with embodiment 1 in the operation of an unregistered road detecting means 45. The navigation apparatus in accordance with this embodiment 11 has the same structure as the navigation apparatus in accordance with above-mentioned embodiment 1. Hereafter, the details of unregistered road detection processing carried out by the unregistered road detecting means 45 will be explained with reference to an explanatory diagram shown in FIG. 19, and a flow chart shown in FIGS. 20 and 21.

Figure 19:
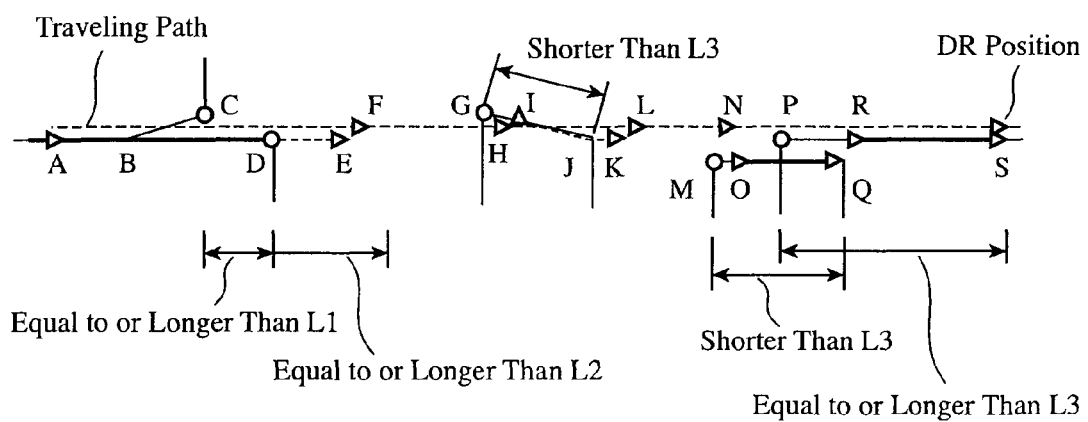
FIG. 19 a diagram showing a transition of the current position of the vehicle identified by a road matching means at a time when the vehicle is traveling along a road containing an unregistered road section, to explain a method of carrying out a setup of candidates for a vehicle departure point and candidates for a vehicle return point, and specification of the unregistered road section, in a navigation apparatus in accordance with embodiment 11 of the present invention.

FIG. 19 is a diagram showing a transition (A-D-E-F-H-I-J-K-L-N-O-Q-R-S) of the position of the vehicle identified by a road matching means 42 when the vehicle travels straightforward along a road (A-D-P-S) in which an unregistered road section (D-P) exists at some midpoint of the road. In this example, assume that the power supply of the navigation apparatus was turned on when the vehicle reached the point A and the current position of the vehicle is at the point S. In each of the sections A-D, I-J, O-Q, and R-S on the registered road, the matching result data indicates that the state of the identification of the current position of the vehicle is a matching state, whereas in each of the sections D-H and J-N, the matching result data indicates that the state of the identification of the current position of the vehicle is a free state. Each of the sections B-C and P-R on the registered road is a section which is determined to have some candidates for the current position of the vehicle by the road matching means 42. The dotted line in the figure is a traveling path acquired by a positioning means 41.

In unregistered road detection processing, the unregistered road detecting means creates a traveling path first, as in the case of step ST407 of above-mentioned embodiment 1 (in step ST501). The unregistered road detecting means then checks to see whether the matching result data outputted from the road matching means 42 indicates the matching state (in step ST502). When, in this step ST502, judging that the matching result data does not indicate the matching state, the unregistered road detecting means carries out a vehicle departure determining process (steps ST511 to ST515) of determining that the vehicle has departed from a registered road. The details of this vehicle departure determining processing will be explained below.

In contrast, when, in step ST502, judging that the matching result data indicates the matching state, the unregistered road detecting means carries out addition of a matching distance and clearing of a free distance (in step ST503). That is, the unregistered road detecting means adds a value calculated on the basis of the positioning data from the positioning means 41 to the matching distance showing a distance over which the matching state continues, and sets the free distance showing a distance over which the free state continues to zero.

The unregistered road detecting means then checks to see whether or not an unregistered road detection flag is cleared (in step ST504). When, in this step ST504, determining that the unregistered road detection flag is cleared, the unregistered road detecting means recognizes that the vehicle has been traveling along a registered road, and then carries out a vehicle departure judgment process (steps ST505 to ST510) of judging whether it is possible that the vehicle has departed from the registered road. The details of this vehicle departure judgment processing will be mentioned below.

In contrast, when, in step ST504, judging that the unregistered road detection flag is not cleared, the unregistered road detecting means carries out a return judgment process (steps ST516 to ST527) of recognizing that the vehicle has traveled along an unregistered road, judging whether the vehicle has returned to a registered road, determining the vehicle departure point and the vehicle return point, calculating the coordinates of the unregistered road section, and so on. The details of this return judgment processing will be explained below.

(1) Vehicle Departure Judgment Processing

In the vehicle departure judgment processing, the unregistered road detecting means carries out vehicle departure judgment first, as in the case of step ST402 of above-mentioned embodiment 1 (in step ST505). On the basis of the judgment result in step ST505, the unregistered road detecting means checks to see if it is possible that the vehicle has departed from a registered road (in step ST506). When, in this step ST506, determining that it is possible that the vehicle has departed from a registered road, the unregistered road detecting means carries out a process of adding a candidate for the vehicle departure point (in step ST507). That is, the unregistered road detecting means records the current position of the vehicle on the registered road as a candidate for the vehicle departure point. In contrast, when, in step ST506, determining that it is not possible that the vehicle has departed from any registered road, the unregistered road detecting means skips the processing of step ST507.

The unregistered road detecting means then adds the distance which the vehicle has traveled after setting up the candidate for the vehicle departure point (in step ST508). That is, for each of candidates for the vehicle departure point which are recorded, the unregistered road detecting means calculates the traveled distance which the vehicle has traveled after setting up each candidate for the vehicle departure point on the basis of the positioning data from the positioning means 41, the traveled distance indicating the distance which the vehicle has traveled until the position of the vehicle is identified as being on the registered road after each candidate for the vehicle departure point is recorded, and adds the traveled distance. The unregistered road detecting means then checks to see whether or not the traveled distance which the vehicle has traveled after setting up each candidate for the vehicle departure point is longer than a predetermined value L1 (in step ST509). When, in this step ST509, determining that the traveled distance which the vehicle has traveled after setting up each candidate for the vehicle departure point is not longer than the predetermined value L1, i.e., the traveled distance is equal to or shorter than the predetermined value L1, the unregistered road detecting means ends the unregistered road detection processing.

In contrast, when, in step ST509, determining that the traveled distance which the vehicle has traveled after setting up each candidate for the vehicle departure point is longer than the predetermined value L1, the unregistered road detecting means recognizes that the vehicle has not departed from the registered road at the recorded candidate for the vehicle departure point, and deletes the recorded candidate for the vehicle departure point and related information (in step ST510) For example, in the example shown in FIG. 19, although the unregistered road detecting means records points C and D as candidates for the vehicle departure point, the unregistered road detecting means deletes the point C from the candidates for the vehicle departure point because the traveled distance which the vehicle has traveled after setting up, as a candidate for the vehicle departure point, the point C is larger than the predetermined value L1 before recording the point D. After that, the unregistered road detecting means ends the unregistered road detection processing.

(2) Vehicle Departure Determining Processing

In the vehicle departure determining processing, the unregistered road detecting means carries out addition of the free distance and clearing of the matching distance first (in step ST511). That is, the unregistered road detecting means calculates and adds the free distance on the basis of the positioning data from the positioning means 41, and also sets the matching distance to zero. The unregistered road detecting means then checks to see whether or not the free distance is longer than a predetermined value L2 (in step ST512). When, in this step ST512, determining that the free distance is not longer than the predetermined value L2, i.e., the free distance is equal to or shorter than the predetermined value L2, the unregistered road detecting means ends the unregistered road detection processing.

In contrast, when, in step ST512, determining that the free distance is longer than the predetermined value L2, the unregistered road detecting means finally determines that the vehicle has departed from the registered road, and sets the unregistered road detection flag (in step ST513). The unregistered road detecting means then checks to see whether any candidate for the vehicle departure point has not been set up yet (in step ST514). That is, the unregistered road detecting means checks to see whether it has recorded any candidate for the vehicle departure point by checking the number of recorded candidates for the vehicle departure point. When, in this step ST514, determining that one or more candidates for the vehicle departure point have been already set up, the unregistered road detecting means ends the unregistered road detection processing.

In contrast, when, in step ST514, determining that any candidate for the vehicle departure point has not been set up yet, the unregistered road detecting means adds a candidate for the vehicle departure point (in step ST515). That is, the unregistered road detecting means searches for the coordinates of a point on the traveling path which is backwardly located by the free distance from the current position of the vehicle, and records the coordinates of the point as a candidate for the vehicle departure point. For example, in the example shown in FIG. 19, the unregistered road detecting means finally determines that the vehicle has departed from the registered road before the F point at which the free distance is longer than the predetermined value L2. After that, the unregistered road detecting means ends the unregistered road detection processing.

(3) Return Judgment Processing

In the return judgment processing, the unregistered road detecting means carries out vehicle return judgment first using the same method as that shown in step ST408 of above-mentioned embodiment 1 (in step ST516). In this processing, the unregistered road detecting means determines that the vehicle has returned to a registered road when the road matching means 42 has continuously set up candidates for the current position of the vehicle on a registered road while the vehicle has traveled a predetermined distance or longer. On the basis of the judgment result in step ST516, the unregistered road detecting means then checks to see whether it is possible that the vehicle has returned to a registered road (in step ST517). When, in this step ST517, determining that it is possible that the vehicle has returned to a registered road, the unregistered road detecting means adds a candidate for the vehicle return point (in step ST518). That is, the unregistered road detecting means additionally records the current position of the vehicle on the registered road as a candidate for the vehicle return point. In contrast, when, in step ST517, determining that it is not possible that the vehicle has returned to any registered road yet, the unregistered road detecting means skips the process of step ST518.

The unregistered road detecting means then checks to see whether or not the matching distance is equal to or longer than a predetermined value L3 (in step ST519). When, in this step ST519, determining that the matching distance is not equal to or longer than the predetermined value L3, i.e., the matching distance is shorter than the predetermined value L3, the unregistered road detecting means recognizes that the vehicle has not returned to any registered road yet, and ends the unregistered road detection processing.

In contrast, when, in step ST519, determining that the matching distance is equal to or longer than the predetermined value L3, the unregistered road detecting means recognizes that the vehicle has returned to a registered road, and carries out processes of steps ST520 to ST527. For example, in the example shown in FIG. 19, the unregistered road detecting means records points G, M and P as candidates for the vehicle return point, and finally determines that the vehicle has returned to a registered road at the point S at which the matching distance becomes longer than the predetermined value L3.

In step ST520, the unregistered road detecting means checks to see whether any candidate for the vehicle return point has not been set up yet. That is, the unregistered road detecting means checks to see whether any candidates for the vehicle return point has not been recorded yet by checking the number of recorded candidates for the vehicle return point. When, in this step ST520, determining that any candidate for the vehicle return point has not been set up yet, the unregistered road detecting means adds a candidate for the vehicle return point (in step ST521). That is, the unregistered road detecting means searches for the coordinates of a point on the traveling path which is backwardly located by the matching distance from the current position of the vehicle (particularly, the current position of the vehicle on the registered road which is stored as a set with the positioning data), and records the coordinates of the point as a candidate for the vehicle return point. When, in step ST520, determining that one or more candidates for the vehicle return point have been set up, the unregistered road detecting means skips the processing of step ST521.

The unregistered road detecting means then selects a combination of a candidate for the vehicle departure point and a candidate for the vehicle return point (in step ST522). That is, for each of all combinations of the candidates for the vehicle departure point and the candidates for the vehicle return point, the unregistered road detecting means carries out the same affine transformation as that explained in above-mentioned embodiment 1 so that the coordinates of the ends of a traveling path corresponding to each of all the combinations of the candidates for the vehicle departure point and the candidates for the vehicle return point match with those of the corresponding candidates for the vehicle departure point and for the vehicle return point, respectively, and calculates an amount of transformation caused by the affine transformation in the coordinate system, concretely, an amount of movement in the coordinate system, an expansion-and-contraction coefficient, and a rotation angle. The unregistered road detecting means then selects a combination of a candidate for the vehicle departure point and a candidate for the vehicle return point which minimizes the amount of transformation in the coordinate system caused by the affine transformation.

The unregistered road detecting means then checks to see whether the amount of transformation in the coordinate system falls within an allowable range (in step ST523). When, in this step ST523, determining that the amount of transformation in the coordinate system falls within the allowable range, the unregistered road detecting means recognizes that it could specify an unregistered road section, and carries out calculation of the coordinates of the unregistered road by means of the same method as shown in step ST414 of above-mentioned embodiment 1 (in step ST524). That is, the unregistered road detecting means creates road data from the traveling path on which it has performed a coordinate transformation so that the traveling path is connected to the specified unregistered road section. In contrast, when, in this step ST523, determining that the amount of transformation in the coordinate system does not fall within the allowable range, the unregistered road detecting means recognizes that it could not specify any unregistered road section, and skips the processing of step ST524.

The unregistered road detecting means then initializes the traveling path in order to place itself in a state in where it can detect the next unregistered road (in step ST525), clears the unregistered road detection flag (in step ST516), and further initializes both the candidates for the vehicle departure point and the candidates for the vehicle return point (in step ST527). After that, the unregistered road detecting means ends the unregistered road detection processing. In the example shown in FIG. 19, the unregistered road detecting means compares amounts acquired by performing a coordinate transformation on traveling path portions respectively corresponding to the D-G section, the D-M section, and the D-P section with one another, and selects the D-P section as the unregistered road section.

As previously explained, the navigation apparatus in accordance with this embodiment 11 records a point at which it is possible that the vehicle has departed from a registered road and a point at which it is possible that the vehicle has returned to a registered road, as a candidate for the vehicle departure point and a candidate for the vehicle return point, respectively, and, when the state of the identification of the current position of the vehicle continues to be the matching state while the vehicle travels a predetermined distance or longer along a registered road after traveling an unregistered road section, selects one of all combinations of candidates for the vehicle departure point and candidates for the vehicle return point and performs a coordinate transformation on a corresponding traveling path within a predetermined limit, and determines a combination of a candidate for the vehicle departure point and a candidate for the vehicle return point which minimizes the amount of transformation as an unregistered road section. Therefore, this embodiment can improve the probability of succeeding in the detection of an unregistered road.

In accordance with this embodiment 11, in a case in which traveling path portions corresponding to all the combinations of candidates for the vehicle departure point and candidates for the vehicle return point include two or more traveling path portions each of which minimizes the amount of coordinate transformation indicated by the amount of movement in the coordinate system, expansion-and-contraction coefficient, and rotation angle of each traveling path, which are caused by the coordinate transformation, within predetermined limits which are estimated from the accuracy of the coordinates of roads indicated by road data, the accuracy of the current position of the vehicle, and the accuracy of correction of each sensor, and each of which is determined to show the highest consistency with a registered road, the navigation apparatus can determine, as the vehicle departure point and the vehicle return point, a candidate for the vehicle departure point and a candidate for the vehicle return point for which the distance which the vehicle has traveled while the matching result data has been indicating the matching state is the longest, respectively. In this case, the navigation apparatus can select only one combination of a candidate for the vehicle departure point and a candidate for the vehicle return point, and can improve the reliability of the coordinates of the unregistered road section which is created on the basis of this selected combination of a candidate for the vehicle departure point and a candidate for the vehicle return point.

Embodiment 12

Figure 22:
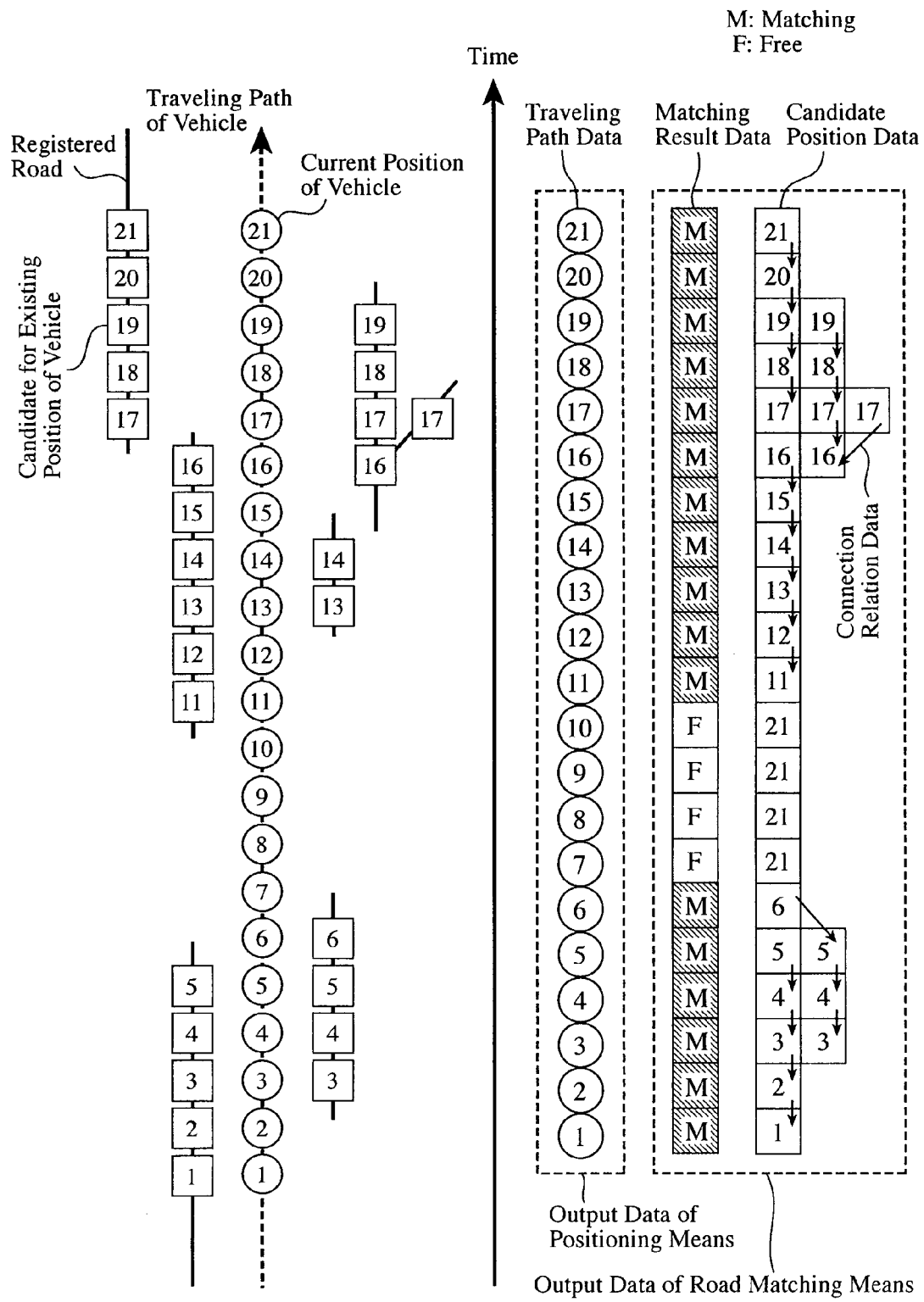
FIG. 22 is a diagram for explaining positioning data which is used in a navigation apparatus in accordance with embodiment 12 of the present invention.

A navigation apparatus in accordance with this embodiment 12 differs from the navigation apparatus in accordance with embodiment 1 in the functions of a road matching means 42 and an unregistered road detecting means 45. Hereafter, the details of processing carried out by the road matching means 42 and processing carried out by the unregistered road detecting means 45 will be explained with reference to an explanatory diagram shown in FIG. 22.

When acquiring, as positioning data, the position and direction of the vehicle from a positioning means 41, the road matching means 42 judges the state of the identification of the position of the vehicle (i.e., whether the identification state is a matching state or a free state) according to the following conditions, and outputs the result of this judgment as matching result data. That is, when there exists one or more candidates for the position of the vehicle having a distance from the current position of the vehicle which is equal to or shorter than a predetermined distance and having an angular difference with the direction of the vehicle which is equal to or smaller than a predetermined angle, the road matching means 42 determines that the identification state is the matching state, or determines that the identification state is the free state otherwise. However, the navigation apparatus can be so constructed as not to carry out judgment about the angular difference when the navigation apparatus can assume that the vehicle is rotating largely and rotationally by, for example, making a right or left turn, e.g., when the angular difference between the newest direction of the vehicle and the immediately-preceding direction of the vehicle is equal to or larger than a predetermined angle. In this case, when a road link exists in the vicinity of the position of the vehicle even if the angular difference is large, the navigation apparatus determines that the identification state is the matching state. The navigation apparatus can be so constructed as to take into consideration an attribute for candidates for the position of the vehicle, such as one-way traffic, when judging the identification state. In this case, even if the above-mentioned conditions about the distance and angle are satisfied, when there exists, as candidates for the position of the vehicle, only a candidate for the position of the vehicle having an attribute of NO TRAFFIC, the navigation apparatus determines that the identification state is the free state.

When the road matching means 42 determines that the identification state is the matching state, it sends, as candidate position data, one or more candidates for the existing position of the vehicle which satisfy the conditions at the time of determining that the identification state is the matching state, as well as the current position and direction of the vehicle which are calculated by the positioning means 41, to the unregistered road detecting means 45.

FIG. 22A is a diagram indicating a relation between the traveling path of the vehicle (i.e., a series of the detected current positions of the vehicle), and candidates for the existing position of the vehicle on a registered road, and FIG. 22B shows a relation among traveling path data which is a set of positioning data at times, matching result data, candidate position data, and connection relation data which will be mentioned below.

The unregistered road detecting means 45 refers to the positioning data from the positioning means 41, and the matching result data from the road matching means 42, and the candidate position data, and sets up each of a detection start point and a detection end point for an unregistered road on a registered road according to the distance between each current position of the vehicle indicated by the positioning data and the corresponding candidate for the existing position of the vehicle on a registered road. In this case, for example, the unregistered road detecting means 45 can select, as the detection start point or detection end point, a candidate for the existing position of the vehicle on a registered road which is the nearest to the series of the detected current positions of the vehicle indicated by the positioning data.

According to this structure, the precision of setting up the detection start point and the detection end point can be improved. Because it is not necessary to refer to the road data stored in the road-map-data storage means 43 anew in order to set up the detection start point and the detection end point, the amount of arithmetic operations and the amount of memory consumption can be reduced.

Furthermore, the road matching means 42 can be so constructed as to send the attributes of a road on which each candidate for the existing position of the vehicle exist, as well as the candidate position data indicating the candidates for the existing position of the vehicle, to the unregistered road detecting means 45. In this case, the unregistered road detecting means 45 refers to the matching result data, the candidate position data, and the attributes from the road matching means 42, and, when setting up each of the detection start point and the detection end point for an unregistered road on a registered road, selects, as the detection start point or detection end point, a candidate for the existing position of the vehicle on the registered road in consideration of the attributes. For example, the unregistered road detecting means provides an attribute which makes it easy to make a connection with an unregistered road in advance, and gives a higher priority to a candidate with the attribute for the existing position of the vehicle on a registered road than to any other candidates with another attribute for the existing position of the vehicle on a registered road when setting up the detection start point and the detection end point. As a result, the precision of setting up the detection start point and the detection end point can be improved.

Furthermore, the road matching means 42 can be so constructed as to judge whether a candidate for the existing position of the vehicle at the current time is connected to a candidate for the existing position of the vehicle corresponding to the position of the vehicle at a time immediately before or before the candidate for the existing position of the vehicle at the current time is determined, and to send, as connection relation data, the judgment result to the unregistered road detecting means 45. In this judgment of whether the candidate for the existing position of the vehicle at the current time is connected to the candidate for the existing position of the vehicle corresponding to the position of the vehicle at a time immediately before or before the candidate for the existing position of the vehicle at the current time is determined, the road matching means judges not only whether they are connected to each other as a road network, but whether they are connected to each other within the limit of a predetermined distance so that they are not contradictory to the traveling path data.

In this case, the unregistered road detecting means 45 refers to the matching result data from the road matching means 42, the candidate position data, and the connection relation data, and, when setting up each of the detection start point and the detection end point for the unregistered road on a registered road, determines, for example, the distance along the candidates for the existing position of the vehicle on a registered road, and sets up each of the detection start point and the detection end point for the unregistered road on a registered road along which the connection with the unregistered road continues over a predetermined distance or longer. As a result, the precision of setting up a connection point between the registered road and the unregistered road can be improved.

Figure 23:
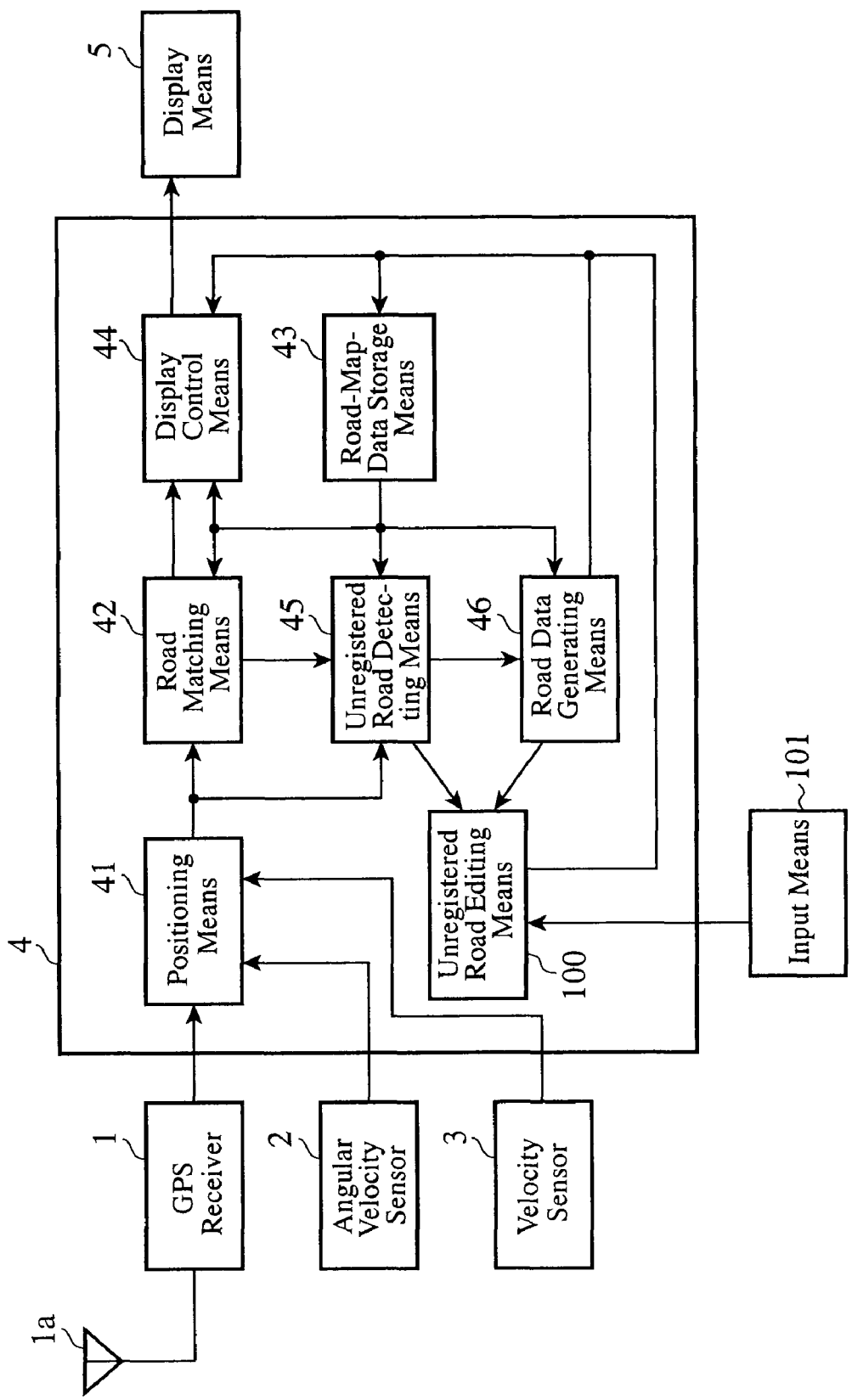
FIG. 23 is a block diagram showing the structure of a navigation apparatus in accordance with a variant of embodiment 12 of the present invention.

FIG. 23 is a block diagram showing the structure of a navigation apparatus in accordance with a variant of this embodiment 12. This navigation apparatus additionally includes an input means 101 in addition to the components of the navigation apparatus in accordance with embodiment 1, and an unregistered road editing means 100 is added to the signal processing unit 4.

The input means 101 is used in order for the user to input coordinates. The coordinates inputted from this input means 101 are sent to the unregistered road editing means 100. The unregistered road editing means 100 creates the coordinates of an unregistered road which connects the coordinates inputted from the input means 101 with each other. The coordinates of the unregistered road created by this unregistered road editing means 100 are sent to the road data generating means 46, the road-map-data storage means 43, and the display control means 44.

In the navigation apparatus in accordance with this variant of embodiment 12, the unregistered road editing means 100 presents the user with the traveling path data sent thereto from the unregistered road detecting means 45 via the display control means 44 and the display means 5, and creates the coordinates of the unregistered road which connects the coordinates which are inputted by the user using the input means 101 with each other. On the basis of these created coordinates, the unregistered road editing means creates the traveling path of the unregistered road, and presents the user with the traveling path. As a result, the user can input correct coordinates by referring to the relation between the displayed traveling path and registered roads. Furthermore, because the user is enabled to correctly input the coordinates of a connection point between a registered road and the unregistered road, or the coordinates of a passing point on the unregistered road, the accuracy of the coordinates of the unregistered road can be improved.

Furthermore, in the navigation apparatus in accordance with this variant of embodiment 12, the unregistered road editing means 100 can be so constructed as to present the user with associated candidate position data in addition to the traveling path data sent thereto from the unregistered road detecting means 45 via the display control means 44 and the display means 5, and to create the coordinates of the unregistered road which connect coordinates which the user inputs using the input means 101 by selecting one data from candidate position data. In this case, the user can input correct coordinates by selecting a candidate position from candidate positions on a registered road which is presented for the user. Furthermore, because the user is enabled to correctly input the coordinates of a connection point between a registered road and the unregistered road, or the coordinates of a passing point on the unregistered road, the accuracy of the coordinates of the unregistered road can be improved.

Many widely different embodiments of the present invention may be constructed without departing from the spirit and scope of the present invention. It should be understood that the present invention is not limited to the specific embodiments described in the specification, except as defined in the appended claims.

What is claimed is:

1. A navigation apparatus comprising:

a sensor for detecting a behavior of a vehicle;

a positioning means for estimating the behavior of the vehicle on a basis of a signal from said sensor;

a road-map-data storage means for storing road data;

a road matching means for comparing positioning data sent thereto, as an estimation result, from said positioning means with the road data read from said road-map-data storage means so as to identify a current position of the vehicle, and for judging whether the identification is placed in a matching state in which the current position is identified as being on a registered road defined by the road data, in a pending state in which whether or not the current position is on a registered road is being judged, or in a free state in which the current position is identified as being off any registered road, and then outputting matching result data indicating the state of the identification;

an unregistered road detecting means for setting up a detection start point and a detection end point for an unregistered road on registered roads which are respectively located before and after sections in which the matching result data from said road matching means indicates that the state of the identification is the free state, respectively, the matching result data indicating that the state of the identification is the matching state when the vehicle travels along each of the registered roads, for performing a coordinate transformation on a traveling path which is created on a basis of the positioning data from said positioning means and which extends from said detection start point to said detection end point in a coordinate system so that a start point of the traveling path has coordinates which match with coordinates of said detection start point and an end point of the traveling path has coordinates which match with coordinates of said detection end point, and for detecting coordinates of the unregistered road from data of the coordinate-transformed traveling path which does not overlap any registered road; and a road data generating means for creating road data about the unregistered road on a basis of the coordinates of the unregistered road detected by said unregistered road detecting means, and for storing them in said road-map-data storage means.

2. The navigation apparatus according to claim 1, wherein said unregistered road detecting means detects the coordinates of the unregistered road from the data of the coordinate-transformed traveling path which does not overlap any registered road if each of an amount of movement in the coordinate system, an expansion-and-contraction coefficient, and a rotation angle of the traveling path falls within a predetermined range which is estimated from accuracy of the current position of the vehicle and accuracy of correction of the sensor in the coordinate transformation.

3. The navigation apparatus according to claim 1, wherein said unregistered road detecting means sequentially records, as a candidate for a vehicle departure point, a point at which it is possible that the vehicle has departed from a registered road before the matching result data from said road matching means indicates the free state, said point being on the registered road which is located before the section in which the matching result data from said road matching means indicates the free state, the matching result data indicating the matching state when the vehicle was traveling along the registered road, also sequentially records, as a candidate for a vehicle return point, a point at which it is possible that the vehicle has returned to a registered road after the matching result data from said road matching means indicates the free state, said point being on the registered road which is located after the section in which the matching result data from said road matching means indicates the free state, performs a coordinate transformation on a traveling path portion corresponding to each of all combinations of candidates for the vehicle departure point and candidates for the vehicle return point which are recorded and which are located between the detection start point and the detection end point so that coordinates of ends of the traveling path portion match with coordinates of a corresponding candidate for the vehicle departure point and coordinates of a corresponding candidate for the vehicle return point, respectively, defines, as the vehicle departure point and the vehicle return point, one candidate for the vehicle departure point and one candidate for the vehicle return point which correspond to one of all coordinate-transformed traveling path portions which minimizes an amount of coordinate transformation shown by an amount of movement in the coordinate system, an expansion-and-contraction coefficient and a rotation angle of the traveling path portion, which are caused by the coordinate transformation, within the predetermined range estimated from the accuracy of the current position of the vehicle and the accuracy of correction of the sensor, and detects the coordinates of the unregistered road from the traveling path portion between said defined vehicle departure point and said defined vehicle return point.

4. The navigation apparatus according to claim 1, wherein said unregistered road detecting means defines, as the detection end point of the unregistered road, the coordinates of the current position of the vehicle on a registered road which said unregistered road detecting means determines has shown similarity with a shape of the traveling path and consistency with a location of the traveling path while the vehicle has been traveling a predetermined distance or longer after the state of the identification indicated by the matching result data from the road matching means changes from the free state to the matching state.

5. The navigation apparatus according to claim 1, wherein said unregistered road detecting means records a traveled distance of the vehicle calculated on the basis of the signal from said sensor, and a state of shielding of GPS electric waves while associating them with the traveling path, checks continuity of the traveling path by comparing an amount of updates of the coordinates of the traveling path with the traveled distance immediately after the vehicle passes through a continuation section in which the GPS electric waves are shielded, determines that a section of the traveling path has been separated into portions when the amount of updates of the coordinates of the traveling path and the traveled distance have a difference equal to or larger than a predetermined value, partially performs a coordinate transformation only on one separated portion of the traveling path so as to form the separated portions into a single traveling path, and, after that, performs a coordinate transformation on the whole single traveling path so that this traveling path has coordinates which match with coordinates of a registered road between the detection start point and the detection end point.

6. The navigation apparatus according to claim 1, wherein said unregistered road detecting means records a portion of a registered road on which said road matching unit has identified the current position of the vehicle when the state of the identification indicated by the matching result data from said road matching means is either the pending state or the matching state, and, in order to determine the portion of the traveling path which does not overlap any registered road, traces said recorded portion of the registered road along a forward direction from the detection start point for the unregistered road so as to detect the vehicle departure point, and also traces said recorded portion of the registered road along a backward direction from the detection end point so as to detect the vehicle return point, and, when being unable to trace said recorded portion of the registered road up to either the vehicle departure point or the vehicle return point, determines whether there is similarity between the shape of the traveling path and that of a recorded registered road and whether there is consistency between the location of the traveling path and that of the recorded registered so as to detect the vehicle departure point and the vehicle return point, and sets the coordinates of the traveling path between the vehicle departure point and the vehicle return point to be the coordinates of the unregistered road.

7. The navigation apparatus according to claim 1, wherein in a case in which there is an intersection in a vicinity of a place where the vehicle makes a right or left turn, and the state of the identification indicated by the matching result data from the road matching means changes from the matching state to the free state according to the right or left turn of the vehicle, and, after that, returns to the matching state by way of the pending state, said unregistered road detecting means cancels the detection of the unregistered road if a coordinate transformation of the traveling path is carried out within a limit of the expansion-and-contraction coefficient of the traveling path estimated from the accuracy of the current position of the vehicle and the accuracy of correction of the sensor which is a velocity sensor.

8. The navigation apparatus according to claim 1, wherein in a case in which the vehicle has passed through an unregistered highway interchange, and has entered a local street from a highway or has entered a highway from a local street, when the road matching means remains being placed in the pending state even if the vehicle travels a predetermined distance or longer along a registered road after passing through the highway interchange, if a traveling path for which detection has been started from the detection start point of the unregistered road on the registered road which the vehicle had traveled before entering the highway interchange overlaps a registered road along which the vehicle has traveled with the road matching means being placed in the pending state over a predetermined distance or longer, or if a registered road is running in parallel with and in a vicinity of the traveling path, the unregistered road detecting means defines, as the detection end point for the unregistered road, a point on the registered road.

9. The navigation apparatus according to claim 1, wherein when both a registered highway and a registered local street are running in parallel with and in a vicinity of a traveling path for which the unregistered road detecting means has started the detection from the detection start point for the unregistered road on the registered road which the vehicle had traveled before entering the unregistered road, said unregistered road detecting means sets up the detection end point for the unregistered road on either one of the registered highway and the registered local street which shows more similarity with the shape of the traveling path or which is closer to the traveling path irrespective of their road types if a significant difference appears between similarity between the shape of the traveling path and that of the registered highway and similarity between the shape of the traveling path and that of the registered local street, or between consistency between the location of the traveling path and that of the registered highway and consistency between the location of the traveling path and that of the registered local street.

10. The navigation apparatus according to claim 1, wherein said unregistered road detecting means stores data about the detection of the unregistered road together with processing results obtained by said positioning means and said road matching means in a non-volatile memory, and, when data indicating that detection of an unregistered road is being carried out is recorded in the non-volatile memory immediately after an engine of said vehicle is started, resumes the detection of the unregistered road.

11. The navigation apparatus according to claim 1, wherein said unregistered road detecting means defines, as the detection start point for the unregistered road, a point on a registered road which is located at a predetermined distance before another point on the registered road at which the vehicle was traveling immediately before the state of the identification state indicated by the matching result data from the road matching means has changed from the matching state to the free state.

12. The navigation apparatus according to claim 11, wherein when the state of the identification indicated by the matching result data from the road matching means is the matching state, said unregistered road detecting means performs a coordinate transformation on a traveling path corresponding to a predetermined distance, and, when the coordinate-transformed traveling path does not fall within a range defined by a predetermined road width, defines, as the detection start point for the unregistered road, a point on the registered road which is backwardly distant from the current position of the vehicle.

13. The navigation apparatus according to claim 3, wherein said unregistered road detecting means acquires a distance over which the state of the identification continues to be the matching state for each candidate for the vehicle departure point and for each candidate for the vehicle return point on a basis of the matching result data from said road matching means, and, when in traveling path portions corresponding to all combinations of candidates for the vehicle departure point and candidates for the vehicle return point, there are two or more traveling path portions in each of which an amount of coordinate transformation shown by an amount of movement in the coordinate system, an expansion-and-contraction coefficient and a rotation angle of the traveling path, which are caused by the coordinate transformation, is minimized within the predetermined range estimated from the accuracy of the current position of the vehicle and the accuracy of correction of the sensor, defines, as the vehicle departure point and the vehicle return point, a candidate for the vehicle departure point and a candidate for the vehicle return point corresponding to a traveling path portion with said distance being longest, respectively.

14. The navigation apparatus according to claim 13, wherein for a candidate for the vehicle departure point which has been recorded before the matching result data from the road matching means indicates the free state continuously while the vehicle travels a predetermined distance or longer, when the matching result data from said road matching means continues to indicate the matching state after that without indicating switching to the free state, said unregistered road detecting means cancels said candidate for the vehicle departure point if a distance calculated for each candidate for the vehicle departure point over which the matching result data from said road matching means continues to indicate the matching state is equal to or longer than a predetermined distance.

15. A navigation apparatus comprising:
a sensor for detecting a behavior of a vehicle;
a positioning section for estimating a position of the vehicle on a basis of the behavior detected by said sensor;
a road-map-data storage section configured to store registered road data;
a road matching section configured to compare the position of the vehicle with the registered road data, and determine a vehicle state based on the comparison, wherein the vehicle state is in a matching state when the road matching section determines that the position of the vehicle is on a registered road, and the vehicle state is in a free state when the road matching section determines that the position of the vehicle is not on a registered road;
an unregistered road detection section configured to create, a detection start point located on the registered road before a time when the vehicle state is in the free state, a traveling path including an interpolation point located on an unregistered road during a time when the vehicle state is in the free state, and a detection end point located on the registered road after a time when the vehicle state has changed to the matching state from the free state; and
a road data generating section configured to create new road data on a basis of the interpolation point of the traveling path.

16. The navigation apparatus according to claim 15, wherein the traveling path includes a start point and an end point and the unregistered road detection section is configured to transform the traveling path such that the start point corresponds to the detection start point and the end point corresponds to the detection end point.

17. The navigation apparatus according to claim 15, wherein the unregistered road detection section is further configured to create coordinates of the traveling path which do not overlap registered road data.

* * * * *